(12) United States Patent
Eberspach et al.

(10) Patent No.: US 11,922,657 B2
(45) Date of Patent: Mar. 5, 2024

(54) DETECTOR FOR DETERMINING A POSITION OF AT LEAST ONE OBJECT

(71) Applicant: trinamiX GmbH, Ludwigshafen am Rhein (DE)

(72) Inventors: Michael Eberspach, Ludwigshafen (DE); Peter Schillen, Ludwigshafen (DE); Patrick Schindler, Ludwigshafen (DE); Robert Send, Karlsruhe (DE); Christian Lennartz, Ludwigshafen (DE); Ingmar Bruder, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 371 days.

(21) Appl. No.: 17/421,767

(22) PCT Filed: Jan. 8, 2020

(86) PCT No.: PCT/EP2020/050250
§ 371 (c)(1),
(2) Date: Jul. 9, 2021

(87) PCT Pub. No.: WO2020/144200
PCT Pub. Date: Jul. 16, 2020

(65) Prior Publication Data
US 2022/0092814 A1    Mar. 24, 2022

(30) Foreign Application Priority Data
Jan. 9, 2019 (EP) .................................... 19150945

(51) Int. Cl.
*G06T 7/73* (2017.01)
*G01S 7/481* (2006.01)
(Continued)

(52) U.S. Cl.
CPC .............. *G06T 7/74* (2017.01); *G01S 7/4816* (2013.01); *G01S 17/48* (2013.01); *G06T 5/002* (2013.01); *G06T 5/20* (2013.01)

(58) Field of Classification Search
CPC .. G06T 7/74; G06T 5/002; G06T 5/20; G06T 2207/10048; G06T 2207/30196;
(Continued)

(56) References Cited

U.S. PATENT DOCUMENTS

2005/0211885 A1* 9/2005 Tobiason ............... G01D 5/268
250/231.13
2006/0017720 A1* 1/2006 Li ...................... G01B 11/2504
345/419

(Continued)

FOREIGN PATENT DOCUMENTS

WO    2012110924 A1    8/2012
WO    2014097181 A1    6/2014
(Continued)

OTHER PUBLICATIONS

International Search Report and Written Opinion for corresponding PCT/EP2020/050250 dated Apr. 22, 2020, 8 Pages.
(Continued)

*Primary Examiner* — Jose L Couso
(74) *Attorney, Agent, or Firm* — Armstrong Teasdale LLP

(57) ABSTRACT

Described herein is a detector for determining a position of an object. The detector includes a sensor element having a matrix of optical sensors, wherein the sensor element is configured to determine a reflection image. The detector also includes an evaluation device configured to select a reflection feature of the reflection image at a first image position in the reflection image, determine a longitudinal coordinate z of the selected reflection feature by optimizing a blurring function $f_a$, and determine a reference feature in a reference
(Continued)

image at a second image position in the reference image corresponding to the reflection feature. The reference image and the reflection image are determined at two different spatial configurations, wherein the spatial configurations differ by a relative spatial constellation, wherein the evaluation device is configured to determine the relative spatial constellation from the longitudinal coordinate z and the first and the second image positions.

27 Claims, 5 Drawing Sheets

(51) Int. Cl.
*G01S 17/48* (2006.01)
*G06T 5/00* (2006.01)
*G06T 5/20* (2006.01)

(58) Field of Classification Search
CPC . G06T 2207/30221; G06T 2207/30232; G06T 2207/30242; G06T 2207/30244; G06T 2207/30252; G06T 2207/30256; G06T 7/571; G06T 7/593; G06T 7/85; G06T 7/521; G06T 7/251; G06T 2207/10016; G06T 2207/10028; G06T 7/579; G06T 7/73; G06T 5/50; G06T 2200/04; G06T 7/97; G01S 7/4816; G01S 17/48; G01S 17/46; G01S 17/89; G06V 10/1456; G06V 2201/12; G06V 10/255; G06V 40/1347; H04N 13/106; H04N 13/236; H04N 13/271
See application file for complete search history.

(56) References Cited

U.S. PATENT DOCUMENTS

| 2008/0240502 | A1* | 10/2008 | Freedman | G06V 10/145 |
| | | | | 382/103 |
| 2010/0118123 | A1 | 5/2010 | Freedman et al. | |
| 2016/0026253 | A1* | 1/2016 | Bradski | H04N 13/128 |
| | | | | 345/8 |

FOREIGN PATENT DOCUMENTS

| WO | 2014198629 A1 | 12/2014 |
| WO | 2016078728 A1 | 5/2016 |
| WO | 2017012986 A1 | 1/2017 |

OTHER PUBLICATIONS

Mannan Fahim et al, "Blur Calibration for Depth from Defocus", 2016 13th Conference on Computer and Robot Vision (CRV), IEEE, Jun. 1, 2016, p. 281-288.

Ramalingam et al., "Pose Estimation using Both Points and Lines for Geo-Localization", published in Robotics and Automation (ICRA), 2011 IEEE International Conference, Publisher: IEEE ISBN: 978-1-61284-385-8.

X. Jiang, H. Bunke: "Dreidimensionales Computersehen", Chapter 2, Springer, Berlin Heidelberg, 1997.

Kurt Konolige et al., A Low-Cost Laser Distance Sensor, 2008 IEEE International Conference on Robotics and Automation, Pasadena, CA, USA, May 19-23, 2008.

* cited by examiner

DETECTOR FOR DETERMINING A POSITION OF AT LEAST ONE OBJECT

CROSS-REFERENCE TO RELATED APPLICATIONS

This application is a U.S. National Phase Application of International Patent Application No. PCT/EP2020/050250, filed Jan. 8, 2020, which claims priority to European Patent Application No. 19150945.4, filed Jan. 9, 2019, each of which is hereby incorporated by reference herein.

FIELD OF THE INVENTION

The invention relates to a detector for determining a position of at least one object, a method for determining a relative spatial constellation by using at least one detector for determining a position of at least one object and a method for calibrating at least one detector. The invention further relates to a human-machine interface for exchanging at least one item of information between a user and a machine, an entertainment device, a tracking system, a camera, a scanning system and various uses of the detector device. The devices, methods and uses according to the present invention specifically may be employed for example in various areas of daily life, gaming, traffic technology, production technology, security technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

Optical 3D sensing methods generally may determine unreliable results in case of environment causing multiple reflections, with biasing light sources, or reflective measurement objects. Furthermore, 3D sensing methods, such as triangulation methods using structured light or stereo cameras, with imaging capabilities often suffer from a high demand of computational power to solve correspondence problems. Necessary computational power may result in high costs for processors or Field Programmable Gate Arrays (FPGAs), for heat removal in view of ventilation requirements or waterproof housing difficulties, for electrical power consumption, in particular in mobile devices, and, in addition, in measurement uncertainties. The high demand in computational power may be prohibitive to realize real-time applications, high framerates or even standards video speed frame rates of 25 frames per second.

A large number of optical devices are known from the prior art using triangulation imaging methods. For example, structured light methods or stereo methods are known. For example, passive stereo methods using two cameras in a fixed relative orientation or active stereo technologies, where an additional light projector is used. Another example is the structures light approach, where one light projector and one camera in a fixed relative orientation are used. In order to determine a depth image via triangulation, the correspondence problem has to be solved first. Therefore, in passive stereo camera techniques enough corresponding feature points have to be identified in both camera views. In structured light approaches correspondences between pre-stored and projected pseudo random light patterns have to be determined. For a robust solution of these correspondence problems computational imaging algorithms such as algorithms scaling approximately quadratically with the number of points in the projected point pattern have to be employed. In structured light methods, for example, using a stereo system comprising two detectors having a fixed relative distance, a light source projects a pattern such as points, pseudo-random, random, non-periodic or irregular point patterns, or the like. Each of the detectors generates an image of a reflection pattern and an image analysis task is to identify corresponding features in the two images. Due to fixed relative position a corresponding feature point selected in one of the two images lies along an epipolar line in the other image. However, solving the so-called correspondence problem may be difficult. In stereo and triangulation systems, the distance of all feature points along the epipolar line has to have reasonable correspondence among each other. A correspondence decision cannot be made one after another. If one correspondence is wrong, this has implications for other feature points, such as invisibility. This usually yields non-linear such as quadratic scaling evaluation algorithms.

For example, US 2008/0240502 A1 and US 2010/0118123 A1 describe an apparatus for mapping an object including an illumination assembly, which includes a single transparency containing a fixed pattern of spots. A light source transilluminates the single transparency with optical radiation so as to project the pattern onto the object. An image capture assembly captures an image of the pattern that is projected onto the object using the single transparency. A processor processes the image captured by the image capture assembly as to reconstruct a three-dimensional map of the object.

Furthermore, 3D sensing methods are known which use for distance determination a so-called pose estimation or structure from motion or shape from motion, see for example Ramalingam et al., "Pose Estimation using Both Points and Lines for Geo-Localization", published in Robotics and Automation (ICRA), 2011 IEEE International Conference, Publisher: IEEE ISBN: 978-1-61284-385-8. The term "structure from motion" will be used as synonym for both structure from motion and shape from motion. In pose estimation algorithms camera pictures are recorded and the pose of the camera such as viewing direction, distance from the object, speed of the camera is estimated. In the same way, in structure from motion algorithms, the 3D structure of objects is recorded by estimating the pose of the camera and thus the positions of image features with respect to each other. Without being bound by this theory, both algorithms base on the observation that in the images of a moving camera objects, close to the camera move faster than objects further away. By tracking feature points from image to image it is possible to deduct the distance to the camera.

Furthermore, WO 2017/012986 A1 describes a detector for determining a position of at least one object. The detector comprises: —at least one optical sensor, the optical sensor being configured to detect at least one light spot generated by at least one light beam propagating from the object towards the detector, the optical sensor having at least one matrix of pixels, each pixel being adapted to generate at least one pixel signal $s_{i,j}$ in response to an illumination of the pixel by the light beam; —at least one non-linearization device configured to transform the pixel signals $s_{i,j}$ of all pixels i, j or of at least one group of pixels into nonlinear pixel signals $s'_{i,j}$, the nonlinear pixel signals $s'_{i,j}$ each being a nonlinear function of the power of the illumination $p_{ij}$ of the respective pixel; —at least one summing device configured to add up the nonlinearpixel signals s'ij of all pixels i, j or of the at least one group of pixels and to generate at least one nonlinear sum signal S'=Σij s'ij; and —at least one evaluation device, the evaluation device being configured to determine at least one longitudinal coordinate z of the object by evaluating the nonlinear sum signal S'.

Despite the advantages implied by the above-mentioned devices and detectors, several technical challenges remain.

The evaluation algorithms used in known 3D sensing methods require high computation power which is a severe cost driver. Furthermore, due to energy consumption and heat production of the required computational resources, the computational demand limits use of such 3D sensor methods in outdoor and mobile applications.

Furthermore, triangulation systems heavily rely on a fixed, unaltered mechanical connection between illumination source and the sensor, e.g. in detectors using structured light or laser triangulation, or between two sensors e.g. of a stereo system. Correct knowledge of the distance of the illumination source and the sensor or the two sensors is fundamental to the distance measurement. A change in distance may cause errors, such as offsets, linear, quadratic or higher order errors in the distance measurement. In known 3D sensing methods significant mechanical effort and costs are undertaken to produce a stable distance. Stability concerns exist especially with respect to ageing, temperature changes, mechanical stress, or the like.

Furthermore, pose estimation algorithms are not able to determine whether the camera is close and moving slow or far away and moving fast. Thus, these algorithms lack a scaling factor to allow absolute measurements. In known 3D sensing methods using moving cameras, the velocity of the camera is often measured by an inertial measurement unit of the camera, however, with limited accuracy.

Problem Addressed by the Invention

It is therefore an object of the present invention to provide devices and methods facing the above-mentioned technical challenges of known devices and methods. Specifically, it is an object of the present invention to provide devices and methods which reliably may determine a position of an object in space, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention, a detector for determining a position of at least one object is disclosed. As used herein, the term "object" refers to a point or region emitting at least one light beam. The light beam may originate from the object, such as by the object and/or at least one illumination source integrated or attached to the object emitting the light beam, or may originate from a different illumination source, such as from an illumination source directly or indirectly illuminating the object, wherein the light beam is reflected or scattered by the object. As used herein, the term "position" refers to at least one item of information regarding a location and/or orientation of the object and/or at least one part of the object in space. Thus, the at least one item of information may imply at least one distance between at least one point of the object and the at least one detector. As will be outlined in further detail below, the distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
- at least one sensor element having a matrix of optical sensors, the optical sensors each having a light-sensitive area, wherein the sensor element is configured to determine at least one reflection image;
- at least one evaluation device, wherein the evaluation device is configured to select at least one reflection feature of the reflection image at at least one first image position in the reflection image, wherein the evaluation device is configured for determining at least one longitudinal coordinate z of the selected reflection feature by optimizing at least one blurring function $f_a$, wherein the evaluation device is configured to determine at least one reference feature in at least one reference image at at least one second image position in the reference image corresponding to the at least one reflection feature, wherein the reference image and the reflection image are determined at two different spatial configurations, wherein the spatial configurations differ by a relative spatial constellation, wherein the evaluation device is configured to determine the relative spatial constellation from the longitudinal coordinate z and the first and second image positions.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As used herein, an "optical sensor" generally refers to a light-sensitive device for detecting a light beam, such as for detecting an illumination and/or a light spot generated by at least one light beam.

As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as triangular, circular, hexagonal, or further nonrectangular arrangements. As an example, circular arrangements are also feasible, wherein the elements are arranged in concentric circles or ellipses about a center point. For example, the matrix may be a single row of pixels. Other arrangements are feasible. The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane.

As further used herein, a "light-sensitive area" generally refers to an area of the optical sensor which may be illuminated externally, by the at least one light beam, in response to which illumination at least one sensor signal is generated. The light-sensitive area may specifically be located on a surface of the respective optical sensor. Other embodiments, however, are feasible. As used herein, the term "the optical sensors each having at least one light-sensitive area" refers to configurations with a plurality of single optical sensors each having one light-sensitive area and to configurations with one combined optical sensor having a plurality of light-sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo sensors, such as commercially available silicon photodiodes, each having precisely one sensitive area, may be used in the set-up. Other embodiments, however, are feasible. Thus, as an example, an optical device comprising two, three, four or more than four light-sensitive areas may be used which is regarded as two, three, four or more than four optical sensors in the context of the present invention. As outlined above, the sensor element comprises a matrix of optical sensors. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

The optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular. As used herein, the term "essentially perpendicular" refers to the condition of a perpendicular orientation, with a tolerance of e.g. ±20° or less, preferably a tolerance of ±10° or less, more preferably a tolerance of ±5° or less. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Preferably, the sensor element may be oriented essentially perpendicular to an optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

As used herein, the term "light beam propagating from the object" refers to at least one light beam which may originate from the object or may originate from an illumination source, such as from an illumination source directly or indirectly illuminating the object, wherein the light beam is reflected or scattered by the object and, thereby, is at least partially directed towards the detector. The light beam propagating from the object may also be denoted as "reflection light beam" in the following. The detector may be used in active and/or passive illumination scenarios. For example, the at least one illumination source may be adapted to illuminate the object, for example, by directing a light beam towards the object, which reflects the light beam. The illumination source may be or may comprise at least one multiple beam light source. For example, the illumination source may comprise at least one laser source and one or more diffractive optical elements (DOEs). Additionally or alternatively, the detector may use radiation already present in the scene such as from at least one ambient light source.

The light beam propagating from the object to the detector specifically may fully illuminate at least one of the optical sensors such that the at least one optical sensor is fully located within the light beam, with a width of the light beam being larger than the light-sensitive area of the at least one optical sensor from which the sensor signal arises. Contrarily, preferably, the reflection light beam specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device as will be outlined in further detail below. As further used herein, a "light spot" generally refers to a visible or detectable round or non-round illumination of an article, an area or object by a light beam.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam specifically may be a Gaussian light beam or a linear combination of Gaussian light beams, as will be outlined in further detail below. Other embodiments are feasible, however. A transfer device may be configured for one or more of adjusting, defining and determining the beam profile, in particular a shape of the beam profile.

The optical sensors may be sensitive in one or more of the ultraviolet, the visible or the infrared spectral range. Specifically, the optical sensors may be sensitive in the visible spectral range from 390 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

The sensor element is configured to determine at least one reflection image. As used herein, the term "reflection image" refers to an image determined by the sensor element comprising at least one reflection feature. As used herein, the term "reflection feature" refers to a feature in an image plane generated by the object in response to illumination, for example with at least one illumination feature. As used herein, the term "illumination feature" refers to at least one arbitrary shaped feature generated by at least one ambient light source or at least one illumination source adapted to illuminate the object. As used herein, the term "determining at least one reflection image" refers to one or more of imaging, recording and generating of the reflection image.

The reflection image may comprise at least one reflection pattern. As used herein, the term "reflection pattern" refers to a response pattern generated by reflection or scattering of light at the surface of the object, in particular generated by the object in response to illumination by the illumination pattern. The illumination pattern may comprise at least one feature adapted to illuminate the object. The illumination feature may be generated by ambient light or by the at least one illumination source. The reflection pattern may comprise at least one feature corresponding to at least one feature of the illumination pattern. The reflection pattern may comprise, in comparison to the illumination pattern, at least one distorted pattern, wherein the distortion depends on the distance of the object, such as surface properties of the object.

The detector may further comprise an illumination source. As an example, the illumination source may be configured for generating an illuminating light beam for illuminating the object. The detector may be configured such that the illuminating light beam propagates from the detector towards the object along an optical axis of the detector. For this purpose, the detector may comprise at least one reflective element, preferably at least one prism, for deflecting the illuminating light beam onto the optical axis.

The illumination source may be adapted to generate at least one illumination pattern for illumination of the object. Additionally or alternatively, the illumination pattern may be generated by at least one ambient light source. The detector may be configured such that the illumination pattern propagates from the detector, in particular from at least one opening of the housing, towards the object along and/or parallel to an optical axis of the detector. For this purpose, the detector may comprise at least one reflective element, preferably at least one prism, for deflecting the illumination pattern such that it propagates along or parallel to the optical axis. Specifically, the illumination source may comprise at least one laser and/or laser source. Various types of lasers may be employed, such as semiconductor lasers. Additionally or alternatively, non-laser light sources may be used, such as LEDs and/or light bulbs. As used herein, the term "pattern" refers to an arbitrary known or pre-determined arrangement comprising at least one arbitrarily shaped feature. The pattern may comprise at least one feature such as a point or symbol. The pattern may comprise a plurality of features. The pattern may comprise an arrangement of periodic or non-periodic features. As used herein, the term "illumination pattern" refers to a pattern which illuminates the object. The illumination pattern may be generated by ambient light, such as by at least one ambient light source, or by the at least one illumination source. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines.

For example, the illumination source may be adapted to generate and/or to project a cloud of points. The illumination pattern may comprise regular and/or constant and/or periodic pattern such as a triangular pattern, a rectangular pattern, a hexagonal pattern, or a pattern comprising further convex tilings. The illumination pattern may comprise as much as possible features per area such that a hexagonal pattern may be preferred. A distance between two features of the illumination pattern and/or an area of the at least one illumination feature may depend on the circle of confusion in the image.

The illumination source may comprise one or more of at least one light projector; at least one digital light processing (DLP) projector, at least one LCoS projector, at least one spatial light modulator; at least one diffractive optical element; at least one array of light emitting diodes; at least one array of laser light sources. The illumination source may comprise at least one light source adapted to generate the illumination pattern directly. For example, the illumination source may comprise at least one laser source. For example, the illumination source may comprise at least one line laser. The line laser may be adapted to send a laser line to the object, for example a horizontal or vertical laser line. The illumination source may comprise a plurality of line lasers. For example, the illumination source may comprise at least two line lasers which may be arranged such that the illumination pattern comprises at least two parallel or crossing lines. The illumination source may comprise the at least one light projector adapted to generate a cloud of points such that the illumination pattern may comprise a plurality of point pattern. The illumination source may comprise at least one mask adapted to generate the illumination pattern from at least one light beam generated by the illumination source. The illumination source may be one of attached to or integrated into a mobile device such as a smartphone. The illumination source may be used for further functions that may be used in determining an image such as for an autofocus function. The illumination device may be attached to a mobile device such as by using a connector such as a USB- or phone-connector such as the headphone jack.

The illumination source, specifically, may be configured for emitting light in the infrared spectral range. It shall be noted, however, that other spectral ranges are feasible, additionally or alternatively. Further, the illumination source specifically may be configured for emitting modulated or non-modulated light. In case a plurality of illumination sources is used, the different illumination sources may have different modulation frequencies which, as outlined in further detail below, later on may be used for distinguishing the light beams. The detector may be configured for evaluating a single light beam or a plurality of light beams. In case a plurality of light beams propagates from the object to the detector, means for distinguishing the light beams may be provided. Thus, the light beams may have different spectral properties, and the detector may comprise one or more wavelength selective elements for distinguishing the different light beams. Each of the light beams may then be evaluated independently. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. These techniques generally are known to the skilled person in the field of high-frequency electronics. Generally, the evaluation device may be configured for distinguishing different light beams having different modulations.

Specifically, the illumination source and the optical sensors may be arranged in a common plane or in different planes. The illumination source and the optical sensors may have different spatial orientation. In particular, the illumination source and the sensor element may be arranged in a twisted arrangement.

The illumination source may be adapted to generate and/or to project a cloud of points such that a plurality of illuminated regions is generated on the matrix of optical sensors, for example the CMOS detector. Additionally, disturbances may be present on the matrix of optical sensors such as disturbances due to speckles and/or extraneous light and/or multiple reflections. The evaluation device may be adapted to determine at least one region of interest, for example one or more pixels illuminated by the light beam which are used for determination of the longitudinal coordinate of the object. For example, the evaluation device may be adapted to perform a filtering method, for example, a blob-analysis and/or an edge filter and/or object recognition method.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations. The evaluation device may comprise one or more programmable devices such as one or more computers, application-specific integrated circuits (ASICs), Digital Signal Processors (DSPs), or Field Programmable Gate Arrays (FPGAs) which are configured to perform the image analysis such as selection of the reference feature, determining of the longitudinal coordinate z. Additionally or alternatively, however, the evaluation device may also fully or partially be embodied by hardware.

The evaluation device is configured to select at least one reflection feature of the reflection image at at least one first image position in the reflection image. As used herein, the term "select at least one reflection feature" refers to one or more of identifying, determining and choosing at least one reflection feature of the reflection image. The evaluation device may be adapted to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors.

The term "image position in the reflection image" refers to an arbitrary position of the reflection feature in the reflection image. For example, in case of a point-like reflection feature, the image position may be x and y coordinates of the reflection feature. For example, in case of extended reflection feature, the image position may be a coordinate such as x and y coordinates of a center of the reflection feature. The longitudinal coordinate z may correspond to the first image position of the reflection feature. The terms "first", "second", "third" etc. image position are used as names only and do not refer to an order of the image positions.

The evaluation device is configured for determining at least one longitudinal coordinate z of the selected reflection feature by optimizing at least one blurring function $f_a$. Specifically, the evaluation device may be configured for determining at least one distance estimate. As used herein, the term "distance estimate" refers to at least one estimate of the longitudinal coordinate, specifically at least one uncertainty interval defined by the longitudinal coordinate z and a measurement uncertainty ±ε of the determination of the longitudinal coordinate. The error interval ε may depend on the measurement uncertainty of the optical sensor and/or further parameters such as temperature, motion, or the like. The measurement uncertainty of the optical sensors may be pre-determined and/or estimated and/or may be deposited in at least one data storage unit of the evaluation device. For example, the error interval may be ±10%, preferably ±5%, more preferably ±1%. The determining of the distance estimate may yield a distance estimate with an error bar that is generally larger than that of triangulation methods. The longitudinal coordinate z may be determined by using at least one convolution-based algorithm such as a depth-from-defocus algorithm. To obtain the distance from the reflection feature, the depth-from-defocus algorithm estimates the defocus of the object. For this estimation, the blurring function is assumed. As used herein, the term "blurring function $f_a$", also referred to as blur kernel or point spread function, refers to a response function of the detector to the illumination from the object. Specifically, the blurring function models the blur of a defocused object. The at least one blurring function $f_a$ may be a function or composite function composed from at least one function from the group consisting of: a Gaussian, a sinc function, a pillbox function, a square function, a Lorentzian function, a radial function, a polynomial, a Hermite polynomial, a Zernike polynomial, a Legendre polynomial.

The sensor element may be adapted to determine the at least one reflection pattern. The evaluation device may be adapted to select the at least one feature of the reflection pattern and to determine the longitudinal coordinate z of the selected feature of the reflection pattern by optimizing the at least one blurring function $f_a$.

The blurring function may be optimized by varying the parameters of the at least one blurring function. The reflection image may be a blurred image $i_b$. The evaluation device may be configured to reconstruct the longitudinal coordinate z from the blurred image $i_b$ and the blurring function $f_a$. The longitudinal coordinate z may be determined by minimizing a difference between the blurred image $i_b$ and the convolution (*) of the blurring function $f_a$ with at least one further image $i'_b$, $$\min\|(i'_b * f_a(\alpha(z)) - i_b)\|,$$

by varying the parameters σ of the blurring function. σ(z) is a set of distance dependent blurring parameters. The further image may be blurred or sharp. As used herein, the term "sharp" or "sharp image" refers to a blurred image having a maximum contrast. The at least one further image may be generated from the blurred image $i_b$ by a convolution with a known blurring function. Thus, the depth-from-defocus algorithm may be used to obtain a distance estimate of the reflection feature. This distance estimate may be used to efficiently choose a region within which an epipolar line is selected, which will be outlined in more detail below. The distance may then be calculated using triangulation and the selected epipolar line. The determining of the distance estimate can be applied to a single feature of the reflection image, as opposed to most triangulation methods. Thus, the determining of the distance estimate may be used to speed-up the triangulation method by yielding a smaller region in which the correspondence problem is solved.

The evaluation device is configured to determine at least one reference feature in at least one reference image at at least one second image position in the reference image corresponding to the at least one reflection feature. Specifically, the evaluation device, e.g. at least one image processing device of the evaluation device, may be configured to perform at least one image analysis for determining the reference feature in the reference image corresponding to the reflection feature. As used herein, the term "reference image" refers to an image different from the reflection image. The reference image may be determined by one or more of recording at least one reference feature, imaging the at least one reference feature, calculating of the reference image. The reference image and the reflection image are determined at two different spatial configurations. For example, one of the reference image and the reflection image may be determined by a first optical sensor at a first spatial position and/or spatial orientation, wherein the other one of the reference image and the reflection image may be determined by a second optical sensor at a second spatial position and/or spatial orientation which differs from the first spatial position and/or orientation. For example, the reference image and the reflection image may be determined by the same optical sensor at different points in time and/or at different spatial positions and/or at different spatial orientation. The evaluation device may comprise at least one storage device, in which at least one reference image may be stored. The reference image may be a pre-determined and/or a pre-known reference image. For example, in case of using structured light, the evaluation device may be adapted to select and/or determine dependent on the at least one pattern of the structured light the respective reference image.

As used herein, the term "spatial configuration" refers to arrangement of the reference image and the reflection image in space such as orientation, in particular spatial angle and/or torsion angle, and/or position. In particular, the spatial configuration may refer to an arrangement of the at least two sensor elements and/or at least one sensor element and the at least one illumination source in space such as orientation, in particular spatial angle and/or torsion angle, and/or position. As used herein, the term "relative spatial constellation" refers to relative alignment of the reference image and reflection image in space. The relative spatial constellation may be at least one constellation selected from the group consisting of: a relative spatial orientation; a relative angle position; a relative distance; a relative displacement; relative movement. For example, the relative spatial constellation may be a relative spatial orientation and/or a relative angle position and/or a relative distance and/or a relative displacement and/or a relative movement of the at least two sensor elements and/or at least one sensor element and the at least one illumination source. The relative spatial constellation may be a baseline. As used herein, the term "baseline" refers to a relative spatial orientation and/or a relative angle position such as relative angle or relative torsion angle and/or a relative distance and/or a relative displacement. The evaluation device may be adapted to store a determined value of the relative spatial constellation.

In one embodiment, the detector may comprise at least two sensor elements separated by the relative spatial constellation, in particular the baseline. At least one first sensor element may be adapted to record the reference image and at least one second sensor element may be adapted to record the reflection image. Specifically, the first sensor element may be configured to image the reference image and at least one second sensor element may be configured to image the reflection image. The first optical sensor may be arranged such that its sensor element receives at least one image of the reference feature. The second optical sensor may be arranged such that its sensor element receives at least one image of the reflection feature. The first sensor element and the second sensor element may be separated by a mechanical connector. The mechanical connector may be adjustable and/or non-permanent. The detector may comprise at least one stereo camera.

In one embodiment, the detector may be adapted to record the reflection image and the reference image using the same matrix of optical sensors at different times. For example, the sensor element may be adapted to move or to be moved, for example with a constant or variable velocity, from a first spatial configuration to a second spatial configuration. Specifically, the detector may be configured to position the matrix of optical sensors at a first position, wherein the matrix of optical sensors may be configured to image the reference image at the first position. The detector may be configured to position the matrix of the optical sensors at a second position, different from the first position, wherein the matrix of optical sensors may be configured to image the reflection image at the second position.

In one embodiment, the detector may comprise at least one illumination source. The illumination source and the at least one sensor element may be separated by the baseline, for example by a mechanical connector. The mechanical connector may be adjustable and/or non-permanent.

As used herein, the term "to determine at least one reference feature in at least one reference image at at least one second image position corresponding to the at least one reflection feature" refers to selecting the reference feature in the reference image corresponding to the reflection feature. As outlined above, the evaluation device may be adapted to perform an image analysis and to identify features of the reference image. The evaluation device may be adapted to identify at least one reference feature in the reference image having an essentially identical longitudinal coordinate as the selected reflection feature. The term "essentially identical" refers identical within 10%, preferably 5%, most preferably 1%. The reference feature corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that the reference image and the reflection image may be images of the object determined at different spatial positions and/or spatial orientations having, for example during recording of reference image and reflection image, a fixed distance. The distance may be a relative distance, also denoted as baseline. The evaluation device may be adapted to determine an epipolar line in the reference image. The relative position of the reference image and reflection image may be known. For example, the relative position of the reference image and the reflection image may be stored within at least one storage unit of the evaluation device. The evaluation device may be adapted to determine a straight line extending from the selected reflection feature of the reflection image to a real world feature from which it originates. Thus, the straight line may comprise possible object features corresponding to the selected reflection feature. The straight line and the baseline span an epipolar plane. As the reference image is determined at a different relative constellation from the reflection image, the corresponding possible object features may be imaged on a straight line, called epipolar line, in the reference image. The epipolar line may be the intersection of the epipolar plane and the reference image. Thus, a feature of the reference image corresponding to the selected feature of the reflection image lies on the epipolar line. Due to distortions of the image or changes in the system parameters such as due to ageing, temperature changes, mechanical stress or the like, epipolar lines may intersect or be very close to each other and/or the correspondence between reference feature and reflection feature may be unclear. Further, each known position or object in the real world may be projected onto the reference image and vice versa. The projection may be known due to a calibration of the detector, whereas the calibration is comparable to a teach-in of the epipolar geometry of the specific camera.

Depending on the distance to the object, the reference feature corresponding to the second image position of the reflection feature is displaced within the reference image compared to the first image position. The reference image may comprise at least one displacement region in which the reference feature corresponding to the selected reflection feature may be imaged. The displacement region may comprise only one reference feature. The displacement region may also comprise more than one reference feature. The evaluation device may be configured to determine at least one longitudinal region, wherein the longitudinal region is given by the longitudinal coordinate z and an error interval $\pm\epsilon$. The evaluation device may be configured to determine the at least one displacement region in the reference image corresponding to the longitudinal region. The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device may be configured to determine at least one epipolar line in the reference image. The evaluation device may be adapted to determine the reference feature along the epipolar line corresponding to the longitudinal coordinate z and to determine an extent of the displacement region along the epipolar line corresponding to the error interval $\pm\epsilon$ or orthogonal to an epipolar line. The measurement uncertainty of the distance estimate may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extend in an orthogonal direction with respect to the epipolar line or epipolar lines. The evaluation device may determine the displacement region around the image position of the reflection feature. The evaluation device may be adapted to determine the longitudinal coordinate and to determine the displacement region along the epipolar line corresponding to $z\pm\epsilon$. The evaluation device may determine a displacement region around the second image position of the reflection feature.

The evaluation device may be adapted to match the selected reflection feature with at least one reference feature within the displacement region. As used herein, the term "matching" refers to determining and/or evaluating the corresponding reference and reflection features. The evaluation device may be adapted to match the selected feature of the reflection image with the reference feature within the displacement region by using at least one evaluation algorithm considering the determined longitudinal coordinate z. The evaluation algorithm may be a linear scaling algorithm. The evaluation device may be adapted to determine the epipolar line closest to and/or within the displacement region. The evaluation device may be adapted to determine the epipolar line closest to the second image position of the reflection feature. The extent of the displacement region along the epipolar line may be larger than the extent of the displacement region orthogonal to the epipolar line. The evaluation device may be adapted to determine an epipolar line before determining a corresponding reference feature. The evaluation device may determine a displacement region around the second image position of each reflection feature. The evaluation device may be adapted to assign an epipolar line to each displacement region of each second image position of the reflection features, such as by assigning the epipolar line closest to a displacement region and/or within a displacement region and/or closest to a displacement region along a direction orthogonal to the epipolar line. The evaluation device may be adapted to determine the reference feature corresponding to the second image position of the reflection feature by determining the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured to perform the following steps:
  Determining a displacement region for the second image position of each reflection feature;
  Assigning an epipolar line to the displacement region of each reflection feature such as by assigning the epipolar line closest to a displacement region and/or within a displacement region and/or closest to a displacement region along a direction orthogonal to the epipolar line;
  Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be adapted to decide between more than one epipolar line and/or reference feature to be assigned to a reflection feature such as by comparing distances of reflection features and/or epipolar lines within the second image and/or by comparing error weighted distances, such as ε-weighted distances of reflection features and/or epipolar lines within the second image and assigning the epipolar line and/or reference feature in shorter distance and/or ε-weighted distance to the reference feature and/or reflection feature.

The evaluation device may be adapted to determine a displacement of the reference feature and the reflection feature. The evaluation device may be adapted to determine the displacement of the matched reference feature and the selected reflection feature. The evaluation device, e.g. at least one data processing device of the evaluation device, may be configured to determine the displacement of the reference feature and the reflection feature, in particular by comparing the respective image position of the reference image and the reflection image. As used herein, the term "displacement" refers to the difference between an image position in the reference image to an image position in the reflection image. The evaluation device may be adapted to determine a longitudinal information of the matched feature using a predetermined relationship between a longitudinal coordinate and the displacement. As used herein, the term "longitudinal information" refers to information relating to the longitudinal coordinate $z_{triang}$. For example, the longitudinal information may be a distance value. The evaluation device may be adapted to determine the pre-determined relationship by using triangulation methods. In case the position of the selected reflection feature in the reflection image and the position of the matched reference feature and/or the relative displacement of the selected reflection feature and the matched reference feature are known, the longitudinal coordinate of the corresponding object feature may be determined by triangulation. Thus, the evaluation device may be adapted to select, for example subsequent and/or column by column, a reflection feature and to determine for each potential position of the reference feature the corresponding distance value using triangulation. The displacement and the corresponding distance value may be stored in at least one storage device of the evaluation device. The evaluation device may, as an example, may comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage device may be provided, such as for providing one or more look-up tables for storing the predetermined relationship. The evaluation device may be adapted to store parameters for an intrinsic and/or extrinsic calibration of the camera and/or the detector. The evaluation device may be adapted to generate the parameters for an intrinsic and/or extrinsic calibration of the camera and/or the detector such as by performing a Tsai camera calibration. The evaluation device may be adapted to compute and/or estimate parameters such as the focal length of the transfer device, the radial lens distortion coefficient, the coordinates of the center of radial lens distortion, scale factors to account for any uncertainty due to imperfections in hardware timing for scanning and digitization, rotation angles for the transformation between the world and camera co-ordinates, translation components for the transformation between the world and camera co-ordinates, aperture angles, image sensor format, principal point, skew coefficients, camera center, camera heading, baseline, rotation or translation parameters between camera and/or illumination source, apertures, focal distance, or the like.

The evaluation device is configured to determine the relative spatial constellation from the longitudinal coordinate z and the first and second image positions. As outlined above, the epipolar geometry may require good knowledge of the relative spatial constellation, in particular the baseline, of the reflection image and reference image. However, the relative spatial constellation of the detector components such as illumination source and sensor element or of the at least two sensor elements may be unknown and/or may change during measurement time, for example due to thermal influences or mechanical stress. The longitudinal coordinate z determined can be used to recalibrate triangulation systems. As outlined above, the evaluation device may be adapted to determine the displacement of the reference feature and the reflection feature. The evaluation device may be adapted to determine at least one triangulation longitudinal coordinate $z_{triang}$ of the object by using a pre-defined relationship between the triangulation longitudinal coordinate $z_{triang}$ of the object and the displacement. The triangulation longitudinal coordinate $z_{triang}$ may be determined from the first and second image positions using epipolar geometry assuming a fixed spatial relative constellation and with a pre-defined and/or predetermined value of the spatial relative constellation. As used herein, the term "pre-defined relationship" refers to an assumed relationship and/or predetermined relationship and/or preset relationship. In particular, the pre-defined relationship may depend on the relative spatial constellation. The evaluation device may be adapted to store the pre-defined relationship. The evaluation device may be adapted to compare the longitudinal coordinate z determined by using a depth-from-defocus algorithm and the triangulation longitudinal coordinate $z_{triang}$. The evaluation device may be adapted to determine an actual relationship between the longitudinal coordinate z and the displacement considering the determined relative spatial constellation. The evaluation device, e.g. at least one data processing device of the evaluation device, may be configured to determine the actual relationship between the longitudinal coordinate z and the displacement considering the determined relative spatial constellation. The term "actual relationship" refers to changes, for example due to movement or ambient influences such as temperature, of the relative spatial constellation, in particular the baseline, which result in change of relationship between the triangulation longitudinal coordinate and the displacement. The evaluation device may be adapted to adjust the pre-defined relationship depending on the actual relationship. The evaluation device may be adapted to replace the pre-defined relationship, in particular the stored pre-defined relationship, by the actual relationship and/or the evaluation may be adapted to determine a moving average and to replace the pre-defined relationship by the moving average. The evaluation device may be adapted to determine a difference between the longitudinal coordinate z and the triangulation longitudinal coordinate $z_{triang}$. The evaluation device may be adapted to compare the determined difference to at least one threshold and to adjust the pre-defined relationship in case the determined difference is above or equal to the threshold. The evaluation device may be adapted to determine from the actual relationship and the longitudinal coordinate z the relative spatial constellation. For example, the detector may comprise at least one system comprising the at least one illumination source and sensor element with b being the baseline, d being the displacement on sensor, f being a focal length of a transfer device of the detector and β being an angle between the illumination source and the baseline. For β=90° is $$z_{triang} = f \cdot \frac{b}{d}, \text{ and}$$

$$b = z_{triang} \cdot \frac{d}{f}.$$

Thus, in case the absolute distance to the object, i.e. the longitudinal coordinate z determined from the depth-from-defocus algorithm, is known, $z_{triang}$ can be replaced by z and a corrected baseline $b_{cor}$ can be calculated by $$b_{cor} = z \cdot \frac{d}{f}.$$

For β smaller than 90° is $$z_{triang} = \left(f \cdot \frac{b}{d}\right) \cdot \frac{1}{1 + \cot(\beta)\left(\frac{f}{d}\right)}.$$

Thus, in case the absolute distance to the object z is known, the corrected baseline $b_{cor}$ can be calculated by $$b_{cor} = \left(d \cdot \frac{z}{f}\right) \cdot \left(1 + \cot(\beta)\left(\frac{f}{d}\right)\right)$$

and the angle β can be determined from $$\cot(\beta) = \left(\frac{b_{cor}}{z} - \frac{d}{f}\right).$$

Since β and b may change simultaneously, both values may be determined using subsequent measurements. Thus, the measurement of the longitudinal coordinate z for a feature point, for which in addition the triangulation longitudinal coordinate $z_{triang}$, i.e. the distance from the sensor element to the object determined by triangulation, is known, can be used to correct the predefined relationship. The evaluation device may be adapted to determine and/or to correct and/or to calibrate a value of the relative spatial constellation, such as of the baseline value, by using the longitudinal coordinate z and the triangulation longitudinal coordinate $z_{triang}$.

The evaluation device may be adapted to determine an estimate of a corrected relative spatial relationship using a mathematical model including parameters such as various sensor signals and/or positions and/or the image positions and/or the system properties and/or longitudinal coordinates a displacement on the sensor d, a focal length of a transfer device f, temperature, ztriang, the baseline b, an angle between the illumination source and the baseline β, the longitudinal coordinate z, or the like, wherein the mathematical model may be selected from a Kalman filter, a linear quadratic estimate, a Kalman-Bucy-Filter, a Stratonovich-Kalman-Bucy-Filter, a Kalman-Bucy-Stratonovich-Filter, a minimum variance estimator, a Bayesian estimator, a Best linear unbiased estimator, an invariant estimator, a Wiener filter, or the like to take into account that each sensor signal is subject to measurement errors and inaccuracies. Fusion of these sensor signals within one of the above mathematical models, such as a Kalman filter or the like, may yield an improved estimate such as for the relative spatial constellation and/or the measurement of the longitudinal coordinate z and/or the triangulation longitudinal coordinate $z_{triang}$ and/or the corrected baseline $b_{cor}$ and further help to improve error compensation.

The longitudinal coordinate z and the triangulation longitudinal coordinate $z_{triang}$ may be determined for a plurality of feature points, in particular to get a statistically confirmed value of the calibrated relationship and/or calibrated relative spatial constellation. Since the relative spatial constellation will not change suddenly such a statistical evaluation may be well suited.

The evaluation device may be adapted to repeat determining the relative spatial constellation and/or to recalibrate the relative spatial constellation. The sensor element may be adapted to determine at least one second reflection image. The evaluation device may be adapted to select at least one second reflection feature of the second reflection image at at least one third image position in the second reflection image and to determine at least one second longitudinal coordinate z of the second reflection feature by by optimizing the at least one blurring function $f_a$. The evaluation device may be adapted to determine at least one second reference feature corresponding to the at least one second reflection feature in at least one second reference image at at least one fourth image position in the second reference image. The second reference image and the second reflection image may be determined at two second different spatial configurations. The spatial configurations may differ by an actual relative spatial constellation. The evaluation device may be adapted to determine the actual relative spatial constellation from the second longitudinal coordinate z and the third and fourth image positions. The evaluation device may be adapted to compare the first relative spatial constellation and the actual relative spatial constellation. The evaluation device may be adapted to adjust the first relative spatial constellation depending on the actual relative spatial constellation. The evaluation device may be adapted to replace the first relative spatial constellation by the actual relative constellation and/or the evaluation may be adapted to determine a moving average and to replace the first relative spatial constellation by the moving average. The evaluation device may be adapted to determine a difference between the first relative spatial constellation and the actual relative spatial constellation. The evaluation device may be adapted to compare the determined difference to at least one threshold and to adjust the first relative spatial constellation in case the determined difference is above or equal to the threshold.

Drifts of the baseline may occur especially due to temperature shifts and mechanical damages. The detector may comprise at least one temperature determining unit. The temperature determining unit may be adapted to determine at least one temperature value of the detector. The evaluation device may be adapted to determine the relative spatial constellation considering the temperature value and/or to adjust the relative spatial constellation dependent on the temperature value. The evaluation device may be adapted to monitor evaluation and/or changes of the relative spatial constellation. The monitoring of the relative spatial constellation may be improved by monitoring the temperature of the system, especially of the mechanical connection forming the baseline.

The evaluation device may be adapted to set up a system comprising the at least one sensor element and the at least one illumination source. The at least one sensor element and the illumination source may be set up in a fixed place, but without a pre-determined and/or direct and/or even stable mechanical connection. The mechanical connector may be adjustable and/or non-permanent. The relative spatial constellation of the at least one sensor and the illumination source may be adjustable manually or automatically such as automatically by using motors or manually by the user or during a manufacturing step. The relative spatial constellation may even be changed or adjusted during use. The evaluation device may be adapted to determine the longitudinal coordinate z of the at least one reflection feature in the reflection image determined by the sensor element by optimizing the at least one blurring function $f_a$. The evaluation device may be adapted to determine the relative spatial constellation of the illumination source and the sensor element using the longitudinal coordinate z, as outlined above, and thus, to calibrate the system.

The evaluation device may be adapted to set up mobile stereo systems with a flexible relative constellation, in particular a flexible baseline, comprising a first sensor element and a second sensor element. The first sensor element and the second sensor element may be set up in a fixed place, but without a pre-determined and/or direct and/or even stable mechanical connection. The mechanical connection may be a connection via a mechanical connector. The mechanical connection may be adjustable and/or non-permanent.

The relative spatial constellation of the at least first sensor element and the second sensor element may be adjustable manually or automatically such as automatically by using motors or manually by the user or during a manufacturing step. The relative spatial constellation may even be changed or adjusted during use. The evaluation device may be adapted to determine the longitudinal coordinate z of the at least one reflection feature in the reflection image determined by one of the sensor elements by optimizing the at least one blurring function $f_a$. The evaluation device may be adapted to determine the relative spatial constellation of the first sensor element and the second sensor element using the longitudinal coordinate z, as outlined above, and thus, to calibrate the system.

Using the depth-from-defocus method allows estimating distances, such as the longitudinal coordinate z within the error interval $\varepsilon$. By determining the displacement region corresponding to the estimated longitudinal coordinate and the corresponding error interval allows to reduce the possible number of solutions along the epipolar line significantly. The number of possible solutions may even be reduced to one. Determining of the longitudinal coordinate z and the error interval may be performed during a pre-evaluation before matching the selected reflection feature and reference feature. This may allow reducing the computational demand such that it is possible to significantly reduce costs and to allow a use in mobile device or outdoor devices.

Furthermore, generally in triangulation systems the baseline has to be large in order to detect large distances. Pre-evaluation of the longitudinal coordinate z and error interval using the distance estimate and subsequent matching of the selected reflection feature and reference feature may allow using short baselines such that it may be possible to provide a compact device. In addition, the depth-from-defocus result is not dependent on a baseline or a position of the light source. Furthermore, pre-evaluation of the longitudinal coordinate z and error interval using depth-from-defocus and subsequent matching of the selected reflection feature and reference feature may enhance accuracy and/or speed and/or may lower computational demand in comparison to conventional triangulation systems.

Depth-from-defocus methods may allow estimation of distances from a single feature of an image, such as from a projected point. Further, the number of illumination features such as the number of illumination points in the illumination pattern may be reduced to increase the light intensity in each illumination point such as to compete with ambient light while complying with eye safety regulations. A reduced number of illumination features in a conventional triangulation system might increase the difficulty to match reflection features and reference features. Further, the number of illumination features such as the number of illumination points in the illumination pattern may be increased, such as to increase the resolution of the distance measurement, such as to increase the resolution of the obtained depth map without increasing the processing power of the evaluation device such as in a mobile application.

Specifically, CMOS-based depth-from-defocus-systems may allow estimating distances from a monocular image by integrating areas in an image and forming a quotient of these. The integrations may be performed along circle or edge shapes. When applying a depth-from-defocus-based distance estimation before solving a correspondence problem, the possible number of solutions may be significantly decreased. The distance estimation may be performed for the selected feature point. The distance estimate and its error bar may correspond to a section on the line X and thus on a section of the epipolar line. The quadratically scaling algorithm to solve the correspondence problem, e.g. for structured light, can be reduced to a linearly scaling algorithm. In correspondence problems, computation power is a severe cost driver which can be significantly reduced.

Depth-from-defocus can be used to calibrate and/or to recalibrate the triangulation system. If a distance value such as the longitudinal coordinate z is determined for a feature point, for which also the triangulation distance is determined, using a depth-from-defocus algorithm, the depth-from-defocus distance value can be used to correct the baseline value. The depth-from-defocus distance value can be determined for a large number of triangulation measurements, to get a statistically confirmed value of the recalibrated baseline. Since the baseline will not change suddenly, such a statistical evaluation is well suited. Drifts of the baseline may occur especially due to temperature shifts and mechanical damages. The monitoring of the baseline can be improved by monitoring the temperature of the system, especially of the mechanical connection forming the baseline. Further, the depth-from-defocus calibration may be used to set up mobile stereo systems with a flexible baseline: Two cameras or one camera and the illumination source may be set up in a fixed place, but without a predetermined, direct or even stable mechanical connection. The depth-from-defocus distance value may then be used to determine the baseline in the first place and thus calibrate the system. The calibration process may be identical to determining or re-determining the position of the illumination source.

For example, the reference image may be an image of the illumination pattern at an image plane at a position of the illumination source. The evaluation device may be adapted to determine the displacement region in the reference image corresponding to the longitudinal region of the selected feature of the reflection pattern. The evaluation device may be adapted to match the selected feature of the reflection pattern with at least one feature of the reference pattern within the displacement region.

For example, the detector may comprise at least two sensor elements each having a matrix of optical sensors. At least one first sensor element and at least one second sensor element may be positioned at different spatial positions and/or orientations. The at least one first sensor element may be adapted to determine at least one first reflection pattern, in particular at least one first reflection feature, and the at least one second sensor element may be adapted to determine at least one second reflection pattern, in particular at least one second reflection feature. The evaluation device may be adapted to select at least one image determined by the first sensor element or the second sensor element as reflection image and to select at least one image determined by the other one of the first sensor element or the second sensor element as reference image. The evaluation device may be adapted to select the at least one reflection feature in the reflection pattern and to determine the longitudinal coordinate by optimizing the at least one blurring function $f_a$. The evaluation device may be adapted to determine the displacement region in the reference image corresponding to the longitudinal region of the selected feature of the reflection pattern, wherein the longitudinal region is given by the longitudinal coordinate z and the error interval ±ε. The evaluation device may be adapted to match the selected feature of the reflection pattern with at least one feature of the reference pattern within the displacement region.

In one embodiment, the detector may be adapted to record the reflection image and the reference image using the same matrix of optical sensors, wherein the sensor element moves or is moved with, for example with a constant or variable velocity, from a first spatial configuration to at least one second spatial configuration. The detector may comprise the at least one illumination source which may be movable or fixed. The detector may be adapted to determine a plurality of images, in particular subsequently, wherein one of the images may be selected as reflection image and another one may be selected as reference image. The evaluation device may be adapted to perform a 3D sensing method such as structure from motion or pose estimation, for example as described in Ramalingam et al. "Pose Estimation using Both Points and Lines for Geo-Localization", published in Robotics and Automation (ICRA), 2011 IEEE International Conference on Robotics and Automation, Publisher: IEEE ISBN: 978-1-61284-385-8. The term "structure from motion" will be used as synonym for both structure from motion and shape from motion. The lack of a fixed relative spatial constellation of the reference image and the reflection image such as a baseline may result in a so-called scale drift and loss in accuracy of the distance determination or may not allow an absolute distance measurement without additional information. Structure from motion and pose estimation algorithms cannot reconstruct from the image information of images determined by a moving sensor element alone if the sensor element is close and moving slow or if the sensor element is far away and moving fast. In particular, structure from motion and pose estimation algorithms may determine longitudinal and transversal information such as size, dimension, distance, and/or orientation of an object only up to a scaling factor, whereas the scaling factor scales an internal arbitrary distance unit of the evaluation device to an absolute real world distance scale. In particular, structure from motion and pose estimation algorithms require additional information for image reconstruction in order to scale the image information to an absolute distance scale. The evaluation device may be adapted to determine at least one scaling factor for the relative spatial constellation. The evaluation device may be configured for determining the scaling factor, e.g. by using at least one processor. The evaluation device may be configured to perform an measurement of longitudinal coordinate z and to determine the scaling factor from the longitudinal coordinate z. As used herein, the term "scaling factor", also denoted as scale factor, refers to a transformation, in particular a factor, which scales a distance unit of the evaluation device to an absolute scale. For example, in a structured light system consisting of the at least one image sensor and the at least one illumination source, the baseline may be lengthened due to a temperature increase of the system, resulting in an increased distance between the at least one image sensor and the at least one illumination source, while the focal length of the transfer element such as the at least one lens and the distance of the lens to the sensor are kept fixed. Within this example, when comparing two objects with identical position in the reflection image, wherein a first object may be measured in a first measurement with the original baseline and a second object may be measured in a second measurement with the lengthened baseline, the second object measured with the lengthened baseline appears to be farer away than the object measured with the original baseline. The angles between the baseline and the straight line connecting the feature point in the reflection image with the corresponding feature point on the object itself, may be identical for both objects, so that the two measurements may be compared using the principle of similar triangles. The distance of the object is measured along the straight line. In this example, according to the principle of similar triangles, the quotient of the distance of the object to the lens and the baseline may be identical for the measurement with the original baseline and for the measurement with the lengthened baseline. Thus, the scaling factor that scales the original baseline to the lengthened baseline may be the same that scales the original object distance to the increased object distance. Thus, according to the principle of similar triangles, the scaling factor of the baseline also scales the distance z. The determination of the scaling factor may be further refined by using sensor data from an inertial measurement unit.

The evaluation device may be adapted to determine for at least one feature point of at least one image recorded by the sensor element the longitudinal coordinate z by optimizing the blurring function $f_a$ and to determine the scaling factor therefrom. The scaling factor can be maintained for the remaining measurement and/or as long as at least one feature point can be tracked from one image to another and/or can be recalculated during the measurement. For example, the scaling factor can be determined in every image recorded by the sensor element. This may ensure a statistically verified and consistent measurement of the scaling factor. The scaling factor may be determined from a single measurement point of the image and/or the scaling factor may be determined from a plurality of measurements. In particular, the evaluation device may be adapted to determine medium scaling factor.

The evaluation device may be adapted to infer from at least one determined longitudinal coordinate of at least one feature of the reflection image and/or the reference image at least one longitudinal coordinate of at least one adjacent feature of the reflection image and/or reference image, respectively. The evaluation device may be adapted to infer from the longitudinal coordinate z of the first image position at least one longitudinal coordinate $z_i$ of at least one further feature i at at least one further image position of the reflection image. The term "infer" may refer to deducing or determining the longitudinal coordinate $z_i$.

For determination of the scaling factor in case of relative translation movement of the illumination source and/or the sensor element or of the two sensor elements, the detector may be adapted to determine at least two images with each comprising at least four feature points. For determination of the scaling factor in case of rotation of the components, e.g. of the sensor element, the detector may be adapted to determine at least two images with each image comprising at least six feature points. Preferably, the number of feature points per image is much larger than six, such as more than 60 or more than 600 feature points. Preferably, the feature points in the images correspond to each other.

As outlined above, the detector is adapted to determine the at least one longitudinal coordinate of the object by optimizing the burring function $f_a$. In one embodiment, as outlined above, the detector may be designed as a stereo system comprising two optical sensors separated by the relative spatial constellation. In this embodiment, the detector may be adapted to determine the distance from the object to the detector and/or the relative spatial constellation by using triangulation by stereo.

Additionally or alternative to using triangulation by stereo, the detector may be designed as a structured light system comprising at least one optical sensor and at least one illumination source. In this embodiment, the detector may be adapted to determine the distance from the object to the detector and/or the relative spatial constellation by using structured light, as outlined above. Additionally or alternative to using structured light and/or triangulation by stereo, the detector may use to determine the distance from the object to the detector and/or the relative spatial constellation by using structure from motion or shape from motion methods, as outlined above. In an alternative embodiment, wherein the detector may not be designed as stereo system, but as single optical sensor, the detector may be adapted to determine the distance from the object to the detector and/or the relative spatial constellation by using structured light, as outlined above. Additionally or alternative to using structured light, the detector may determine the distance from the object to the detector and/or the relative spatial constellation by using structure from motion or shape from motion methods, as outlined above.

The detector may further comprise one or more additional elements such as one or more additional optical elements. Further, the detector may fully or partially be integrated into at least one housing.

The detector may comprise at least one optical element selected from the group consisting of: transfer device, such as at least one lens and/or at least one lens system, at least one diffractive optical element. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensors. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. In particular, the detector and the transfer device have a common optical axis. As used herein, the term "optical axis of the transfer device" generally refers to an axis of mirror symmetry or rotational symmetry of the lens or lens system. The optical axis of the detector may be a line of symmetry of the optical setup of the detector. The detector comprises at least one transfer device, preferably at least one transfer system having at least one lens. The transfer system, as an example, may comprise at least one beam path, with the elements of the transfer system in the beam path being located in a rotationally symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths.

The transfer device may constitute a coordinate system, wherein a longitudinal coordinate I is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate I. Any direction perpendicular to the z-axis may be considered a transversal direction, and the polar coordinate and/or the polar angle may be considered a transversal coordinate.

The transfer device may be arranged and/or configured to maximize the focus change within the measurement range. For devices using depth-from-defocus methods it may be beneficial to maximize the focus change within the measurement range, specifically it may be beneficial to reduce the depth of focus within the measurement range.

As outlined above, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. As outlined above, the position of the at least one optical sensor from which the center signal arises may provide information on the at least one transversal coordinate of the object, wherein, as an example, a simple lens equation may be used for optical transformation and for deriving the transversal coordinate. Additionally or alternatively, one or more additional transversal sensors may be used and may be comprised by the detector. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R. A. Street (Ed.): *Technology and Applications of Amorphous Silicon*, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be adapted to combine the information of the longitudinal coordinate and the transversal coordinate and to determine a position of the object in space.

The use of a matrix of optical sensors provides a plurality of advantages and benefits. Thus, a center of the light spot generated by the light beam on the sensor element, such as on the common plane of the light-sensitive areas of the optical sensors of the matrix of the sensor element, may vary with a transversal position of the object. The use of the matrix of optical sensors, thus, provides a significant flexibility in terms of the position of the object, specifically in terms of a transversal position of the object. The transversal position of the light spot on the matrix of optical sensors, such as the transversal position of the at least one optical sensor generating the sensor signal, may be used as an additional item of information, from which at least one item of information on a transversal position of the object may be derived, as e.g. disclosed in WO 2014/198629 A1. Additionally or alternatively, the detector according to the present invention may contain at least one additional transversal detector for, in addition to the at least one longitudinal coordinate, detecting at least one transversal coordinate of the object.

In a further aspect of the present invention, a detector system for determining a position of at least one object is disclosed. The detector system comprises at least one detector according to the present invention, such as according to one or more of the embodiments disclosed above or according to one or more of the embodiments disclosed in further detail below. The detector system further comprises at least one beacon device adapted to direct at least one light beam towards the detector, wherein the beacon device is at least one of attachable to the object, holdable by the object and integratable into the object. Further details regarding the beacon device will be given below, including potential embodiments thereof. Thus, the at least one beacon device may be or may comprise at least one active beacon device, comprising one or more illumination sources such as one or more light sources like lasers, LEDs, light bulbs or the like. As an example, the light emitted by the illumination source may have a wavelength of 390-780 nm. Alternatively, as outlined above, the infrared spectral range may be used, such as in the range of 780 nm to 3.0 µm. Specifically, the near infrared region where silicon photodiodes are applicable specifically in the range of 700 nm to 1000 nm may be used. The light emitted by the one or more beacon devices may be non-modulated or may be modulated, as outlined above, in order to distinguish two or more light beams. Additionally or alternatively, the at least one beacon device may be adapted to reflect one or more light beams towards the detector, such as by comprising one or more reflective elements. Further, the at least one beacon device may be or may comprise one or more scattering elements adapted for scattering a light beam. Therein, elastic or inelastic scattering may be used. In case the at least one beacon device is adapted to reflect and/or scatter a primary light beam towards the detector, the beacon device may be adapted to leave the spectral properties of the light beam unaffected or, alternatively, may be adapted to change the spectral properties of the light beam, such as by modifying a wavelength of the light beam.

In a further aspect of the present invention, a human-machine interface for exchanging at least one item of information between a user and a machine is disclosed. The human-machine interface comprises at least one detector system according to the embodiments disclosed above and/or according to one or more of the embodiments disclosed in further detail below. Therein, the at least one beacon device is adapted to be at least one of directly or indirectly attached to the user or held by the user. The human-machine interface is designed to determine at least one position of the user by means of the detector system, wherein the human-machine interface is designed to assign to the position at least one item of information.

In a further aspect of the present invention, an entertainment device for carrying out at least one entertainment function is disclosed. The entertainment device comprises at least one human-machine interface according to the embodiment disclosed above and/or according to one or more of the embodiments disclosed in further detail below. The entertainment device is configured to enable at least one item of information to be input by a player by means of the human-machine interface. The entertainment device is further configured to vary the entertainment function in accordance with the information. The entertainment device may be or may comprise at least one device selected from the group consisting of: television sets, smart phones, game consoles, video recorders, DVD players, personal computers, laptops, tablets, at least one virtual reality device, or combinations thereof.

In a further aspect of the present invention, a tracking system for tracking a position of at least one movable object is disclosed. The tracking system comprises at least one detector system according to one or more of the embodiments referring to a detector system as disclosed above and/or as disclosed in further detail below. The tracking system further comprises at least one track controller. The track controller is adapted to track a series of positions of the object at specific points in time.

In a further aspect of the present invention, a camera for imaging at least one object is disclosed. The camera comprises at least one detector according to any one of the embodiments referring to a detector as disclosed above or as disclosed in further detail below.

In a further aspect of the present invention, a scanning system for determining a depth profile of a scenery, which may also imply determining at least one position of at least one object, is provided. The scanning system comprises at least one detector according to the present invention, such as at least one detector as disclosed in one or more of the embodiments listed above and/or as disclosed in one or more of the embodiments below. The scanning system further comprises at least one illumination source adapted to scan the scenery with at least one light beam, which may also be referred to as an illumination light beam or scanning light beam. As used herein, the term "scenery" generally refers to a two-dimensional or three-dimensional range which is visible by the detector, such that at least one geometric or spatial property of the two-dimensional or three-dimensional range may be evaluated with the detector. As further used herein, the term "scan" generally refers to a consecutive measurement in different regions. Thus, the scanning specifically may imply at least one first measurement with the illumination light beam being oriented or directed in a first fashion, and at least one second measurement with the illumination light beam being oriented or directed in a second fashion which is different from the first fashion. The scanning may be a continuous scanning or a stepwise scanning. Thus, in a continuous or stepwise fashion, the illumination light beam may be directed into different regions of the scenery, and the detector may be detected to generate at least one item of information, such as at least one longitudinal coordinate, for each region. As an example, for scanning an object, one or more illumination light beams may, continuously or in a stepwise fashion, create light spots on the surface of the object, wherein longitudinal coordinates are generated for the light spots. Alternatively, however, a light pattern may be used for scanning. The scanning may be a point scanning or a line scanning or even a scanning with more complex light patterns. The illumination source of the scanning system may be distinct from the optional illumination source of the detector. Alternatively, however, the illumination source of the scanning system may also be fully or partially identical with or integrated into the at least one optional illumination source of the detector.

Thus, the scanning system may comprise at least one illumination source which is adapted to emit the at least one light beam being configured for the illumination of the at least one dot located at the at least one surface of the at least one object. As used herein, the term "dot" refers to an area, specifically a small area, on a part of the surface of the object which may be selected, for example by a user of the scanning system, to be illuminated by the illumination source. Preferably, the dot may exhibit a size which may, on one hand, be as small as possible in order to allow the scanning system to determine a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 390-780 nm. Additionally or alternatively, light in the infrared spectral range may be used, such as in the range of 780 nm to 3.0 μm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may, thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such as a base plate or holder comprising a magnetic material, in particular for increasing the accuracy of the distance measurement and/or the handleability of the scanning system by the user.

Particularly, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination system as comprised by the scanning system and the single dot as generated by the illumination source may be determined, such as by employing the evaluation device as comprised by the at least one detector. However, the scanning system may, further, comprise an additional evaluation system which may, particularly, be adapted for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined. The illumination source may be adapted to generate and/or to project a cloud of points, for example the illumination source may comprise one or more of at least one digital light processing (DLP) projector, at least one LCoS projector, at least one spatial light modulator; at least one diffractive optical element; at least one array of light emitting diodes; at least one array of laser light sources.

Alternatively, the illumination source of the scanning system may emit two individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beam-splitting devices and mirrors, may be provided which may allow a generation of the described array of the laser beams. In particular, the illumination source may be directed to scan an area or a volume by using one or more movable mirrors to redirect the light beam in a periodic or non-periodic fashion.

Thus, the scanning system may provide a static arrangement of the one or more dots placed on the one or more surfaces of the one or more objects. Alternatively, the illumination source of the scanning system, in particular the one or more laser beams, such as the above described array of the laser beams, may be configured for providing one or more light beams which may exhibit a varying intensity over time and/or which may be subject to an alternating direction of emission in a passage of time, in particular by moving one or more mirrors, such as the micro-mirrors comprised within the mentioned array of micro-mirrors. As a result, the illumination source may be configured for scanning a part of the at least one surface of the at least one object as an image by using one or more light beams with alternating features as generated by the at least one illumination source of the scanning device. In particular, the scanning system may, thus, use at least one row scan and/or line scan, such as to scan the one or more surfaces of the one or more objects sequentially or simultaneously. Thus, the scanning system may be adapted to measure angles by measuring three or more dots, or the scanning system may be adapted to measure corners or narrow regions such as a gable of a roof, which may be hardly accessible using a conventional measuring stick. As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step. As non-limiting examples, the scanning system may be used in industrial safety curtain applications. As non-limiting examples, the scanning system may be used to perform sweeping, vacuuming, mopping, or waxing functions, or yard or garden care functions such as mowing or raking. As non-limiting examples, the scanning system may employ an LED illumination source with collimated optics and may be adapted to shift the frequency of the illumination source to a different frequency to obtain more accurate results and/or employ a filter to attenuate certain frequencies while transmitting others. As non-limiting examples, the scanning system and/or the illumination source may be rotated as a whole or rotating only a particular optics package such as a mirror, beam splitter or the like, using a dedicated motor as such that in operation, the scanning system may have a full 360 degree view or even be moved and or rotated out of plane to further increase the scanned area. Further, the illumination source may be actively aimed in a predetermined direction. Further, to allow the rotation of wired electrical systems, slip rings, optical data transmission, or inductive couplings may be employed.

As a non-limiting example, the scanning system may be attached to a tripod and point towards an object or region with several corners and surfaces. One or more flexibly movable laser sources are attached to the scanning system. The one or more laser sources are moved as such that they illuminate points of interest. The position of the illuminated points with respect to the scanning system is measured when pressing a designated button on the scanning system and the position information is transmitted via a wireless interface to a mobile phone. The position information is stored in a mobile phone application. The laser sources are moved to illuminate further points of interest the position of which are measured and transmitted to the mobile phone application. The mobile phone application may transform the set of points into a 3d model by connecting adjacent points with planar surfaces. The 3d model may be stored and processed further. The distances and or angles between the measured points or surfaces may be displayed directly on a display attached to a scanning system or on the mobile phone to which the position information is transmitted.

As a non-limiting example, a scanning system may comprise two or more flexible movable laser sources to project points and further one movable laser source projecting a line. The line may be used to arrange the two or more laser spots along a line and the display of the scanning device may display the distance between the two or more laser spots that may be arranged along the line, such as at equal distance. In the case of two laser spots, a single laser source may be used whereas the distance of the projected points is modified using one or more beam-splitters or prisms, where a beam-splitter or prism can be moved as such that the projected laser spots move apart or closer together. Further, the scanning system may be adapted to project further patterns such as a right angle, a circle, a square, a triangle, or the like, along which a measurement can be done by projecting laser spots and measuring their position.

As a non-limiting example, the scanning system may be adapted to support the work with tools, such as wood or metal processing tools, such as a saw, a driller, or the like. Thus, the scanning system may be adapted to measure the distance in two opposite directions and display the two measured distances or the sum of the distances in a display. Further, the scanning system may be adapted to measure the distance to the edge of a surface as such that when the scanning system is placed on the surface, a laser point is moved automatically away from the scanning system along the surface, until the distance measurement shows a sudden change due to a corner or the edge of a surface. This makes it possible to measure the distance of the end of a wood plank while the scanning device is placed on the plank but remote from its end. Further, the scanning system may measure the distance of the end of a plank in one direction and project a line or circle or point in a designated distance in the opposite direction. The scanning system may be adapted to project the line or circle or point in a distance depending on the distance measured in the opposite direction such as depending on a predetermined sum distance. This allows working with a tool such as a saw or driller at the projected position while placing the scanning system in a safe distance from the tool and simultaneously perform a process using the tool in a predetermined distance to the edge of the plank. Further, the scanning system may be adapted to project points or lines or the like in two opposite directions in a predetermined distance. When the sum of the distances is changed, only one of the projected distances changes.

As a non-limiting example, the scanning system may be adapted to be placed onto a surface, such as a surface on which a task is performed, such as cutting, sawing, drilling, or the like, and to project a line onto the surface in a predetermined distance that can be adjusted such as with buttons on the scanning device.

As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step.

The transfer device can, as explained above, be designed to feed light propagating from the object to the detector to the optical sensor, preferably successively. As explained above, this feeding can optionally be effected by means of imaging or else by means of non-imaging properties of the transfer device. In particular the transfer device can also be designed to collect the electromagnetic radiation before the latter is fed to the optical sensor. The transfer device can also be wholly or partly a constituent part of at least one optional illumination source, for example by the illumination source being designed to provide a light beam having defined optical properties, for example having a defined or precisely known beam profile, for example at least one linear combination of Gaussian beams, in particular at least one laser beam having a known beam profile.

For potential embodiments of the optional illumination source, reference may be made to WO 2012/110924 A1. Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient illumination source and/or may be or may comprise an artificial illumination source. By way of example, the detector itself can comprise at least one illumination source, for example at least one laser and/or at least one incandescent lamp and/or at least one semiconductor illumination source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector. Alternatively or additionally, at least one illumination source can also be integrated into the at least one beacon device or into one or more of the beacon devices and/or into the object or connected or spatially coupled to the object.

The light emerging from the one or more optional beacon devices can accordingly, alternatively or additionally from the option that said light originates in the respective beacon device itself, emerge from the illumination source and/or be excited by the illumination source. By way of example, the electromagnetic light emerging from the beacon device can be emitted by the beacon device itself and/or be reflected by the beacon device and/or be scattered by the beacon device before it is fed to the detector. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary illumination source, for example by the object or a partial region of the object being excited to generate luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

With respect to design and properties of the beacon devices reference is made to description of the illumination source as described above or as described in more detail below.

The feeding of the light beam to the optical sensor can be effected in particular in such a way that a light spot, for example having a round, oval or differently configured cross section, is produced on the optional sensor area of the optical sensor. By way of example, the detector can have a visual range, in particular a solid angle range and/or spatial range, within which objects can be detected. Preferably, the transfer device may be designed in such a way that the light spot, for example in the case of an object arranged within a visual range of the detector, is arranged completely on a sensor region and/or on a sensor area of the optical sensor. By way of example, a sensor area can be chosen to have a corresponding size in order to ensure this condition.

In a further aspect, the present invention discloses an inertial measurement unit for use in an electronic device. As used herein, the term "inertial measurement unit" refers to a system comprising at least two detector units and which is configured to determine linear and angular motion. The electronic device may be a mobile electronic device. The electronic device may be a camera. The electronic device may be a mobile phone. The inertial measurement unit is adapted to receive data determined by at least one detector according to the present invention, such as according to one or more of the embodiments referring to a detector as disclosed above or as disclosed in further detail below. As used herein, the term "data determined by the at least one detector" refers to at least one information on the relative spatial constellation and/or the at least one longitudinal coordinate z. The inertial measurement unit further is adapted to receive data determined by at least one further sensor selected from the group consisting of: a wheel speed sensor, a turn rate sensor, an inclination sensor, an orientation sensor, a motion sensor, a magneto hydro dynamic sensor, a force sensor, an angular sensor, an angular rate sensor, a magnetic field sensor, a magnetometer, an accelerometer; a gyroscope. As used herein, the term "data determined by the at least one further sensor" refers to at least one information selected from the group consisting of: angle information; speed information; information on turn rate; information on inclination. The inertial measurement unit is adapted to determine by evaluating the data from the detector and the at least one further sensor at least one property of the electronic device selected from the group consisting of: position in space, relative or absolute motion in space, rotation, acceleration, orientation, angle position, inclination, turn rate, speed. The inertial measurement unit may comprise at least one processor. The processor may be adapted to evaluate data recorded by the further sensor. In particular, the processor may be adapted to determine and/or calculate one or more of spatial position, spatial orientation, movement and velocity. The inertial measurement unit may comprise a plurality of further sensors. The inertial measurement unit may be adapted to fuse information determined from at least two of the further sensors. The inertial measurement unit may be adapted to fuse information of at least two further sensors by using at least one mathematical model, whereas the mathematical model may be selected from a Kalman filter, a linear quadratic estimate, a Kalman-Bucy-Filter, a Stratonovich-Kalman-Bucy-Filter, a Kalman-Bucy-Stratonovich-Filter, a minimum variance estimator, a Bayesian estimator, a Best linear unbiased estimator, an invariant estimator, a Wiener filter, or the like. As outlined above, the detector may be adapted to provide an absolute measurement of the longitudinal coordinate z. Furthermore, the detector, as outlined above, may be adapted to determine and/or calibrate and/or recalibrate a relative spatial constellation between at least two sensor elements. The processor, e.g. the evaluation device as described above, may be adapted to fuse the information of the at least two further sensors considering the longitudinal coordinate z and/or the determined relative spatial constellation and/or recalibrate a relative spatial constellation. The various sensor signals may be used within a mathematical model, whereas the mathematical model may be selected from a Kalman filter, a linear quadratic estimate, a Kalman-Bucy-Filter, a Stratonovich-Kalman-Bucy-Filter, a Kalman-Bucy-Stratonovich-Filter, a minimum variance estimator, a Bayesian estimator, a Best linear unbiased estimator, an invariant estimator, a Wiener filter, or the like to take into account that each sensor signal is subject to measurement errors and inaccuracies. Fusion of these sensor signals within one of the above mathematical models such as a Kalman filter may yield an improved estimate such as for the relative spatial constellation and/or the measurement of the longitudinal coordinate.

In a further aspect, the present invention discloses a method for determining a relative spatial constellation by using a detector, such as a detector according to the present invention, such as according to one or more of the embodiments referring to a detector as disclosed above or as disclosed in further detail below. Still, other types of detectors may be used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following method steps:
- determining at least one reflection image of the object by using at least one sensor element having a matrix of optical sensors, the optical sensors each having a light-sensitive area;
- selecting at least one reflection feature of the reflection image at at least one first image position in the reflection image and determining at least one longitudinal coordinate z of the selected reflection feature by optimizing at least one blurring function $f_a$;
- providing at least one reference image, wherein the reference image and the reflection image are determined at two different spatial configurations, wherein the spatial configurations differ by the relative spatial constellation;
- determining at least one reference feature in the reference image at at least one second image position in the reference image corresponding to the longitudinal coordinate z;
- determining the relative spatial constellation from the longitudinal coordinate z and the first and second image positions.

For details, options and definitions, reference may be made to the detector as discussed above. Thus, specifically, as outlined above, the method may comprise using the detector according to the present invention, such as according to one or more of the embodiments given above or given in further detail below.

As used herein, the term "providing at least one reference image" refers to one or more of determining at least one reference image, recording at least one reference image, selecting at least one reference image, for example of a plurality of stored reference images.

The method may comprise monitoring the relative spatial constellation. The relative spatial constellation may be determined repeatedly.

The method may comprise at least one temperature determining step. In the temperature determining step at least one temperature value of the detector may be determined. The relative spatial constellation may be determined considering the temperature value and/or the relative spatial constellation may be adapted dependent on the temperature value.

The detector may comprise at least one illumination source. The method may be used for determining a relative position of the sensor element and the illumination source.

The detector may comprise at least one first sensor element and at least one second sensor element. The first sensor element and the at least one second sensor element may be positioned at different spatial configurations. The method may comprise selecting at least one image determined by the first sensor element or the second sensor element as reflection image and to select at least one image determined by the other one of the first sensor element or the second sensor element as reference image. The method may be used for determining a relative spatial constellation of the first sensor element and the second sensor element.

The method may comprise the step of determining at least one longitudinal coordinate $z_{triang}$ considering the longitudinal coordinate z and the relative spatial constellation, as outlined above.

In a further aspect, the present invention discloses a method for calibrating at least one detector, such as a detector according to the present invention, such as according to one or more of the embodiments referring to a detector as disclosed above or as disclosed in further detail below. Still, other types of detectors may be used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following method steps:
- determining at least one reflection image of the object by using at least one sensor element having a matrix of optical sensors, the optical sensors each having a light-sensitive area;
- selecting at least one reflection feature of the reflection image at at least one first image position in the reflection image and determining at least one longitudinal coordinate z of the selected reflection feature by optimizing at least one blurring function $f_a$;
- providing at least one reference image, wherein the reference image and the reflection image are determined at two different spatial configurations, wherein the spatial configurations differ by a relative spatial constellation;
- determining at least one reference feature in the reference image at at least one second image position in the reference image corresponding to the longitudinal coordinate z;
- determining the relative spatial constellation from the longitudinal coordinate z and the first and second image positions,
- storing the relative spatial constellation as calibration value in at least one data storage device of at least one evaluation unit.

The method may comprise determining a displacement of the reference feature and the reflection feature and determining a relationship between the longitudinal coordinate of the object and the displacement. The method may comprise the step of determining at least one longitudinal coordinate $z_{triang}$ considering the longitudinal coordinate z, as outlined above.

The method further may comprise storing the relative spatial constellation such as in at least one storage unit of the evaluation device.

The method may comprise a recalibration step, the recalibration step comprising the following steps:
- determining at least one further reflection image of the object by using the at least one sensor element;
- selecting at least one further reflection feature of the further reflection image at at least one third image position in the reflection image and determining at least one second longitudinal coordinate z of the further reflection feature by optimizing the at least one blurring function $f_a$;
- providing at least one further reference image, wherein the further reference image and the further reflection image are determined at two different spatial configurations, wherein the spatial configurations differ by an actual relative spatial constellation;
- determining at least one further reference feature in the further reference image at at least one fourth image position in the further reference image corresponding to the second longitudinal coordinate z;
- determining the actual relative spatial constellation from the second longitudinal coordinate z and the third and fourth image positions,
- comparing the first relative spatial constellation and the actual relative spatial constellation and adjusting the first relative spatial constellation depending on the actual relative spatial constellation.

The method further may comprise at least one temperature determining step, wherein at least one temperature value of the detector is determined. The first relative spatial constellation and/or the actual relative spatial constellation may be determined considering the temperature value and/or the first relative spatial constellation and/or the actual relative spatial constellation are adjusted dependent on the temperature value.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a tracking application; a photography application; an imaging application or camera application; a mapping application for generating maps of at least one space; a homing or tracking beacon detector for vehicles; an outdoor application; a mobile application; a communication application; a machine vision application; a robotics application; a quality control application; a manufacturing application.

The object generally may be a living or non-living object. The detector or the detector system even may comprise the at least one object, the object thereby forming part of the detector system. Preferably, however, the object may move independently from the detector, in at least one spatial dimension. The object generally may be an arbitrary object. In one embodiment, the object may be a rigid object. Other embodiments are feasible, such as embodiments in which the object is a non-rigid object or an object which may change its shape.

As will be outlined in further detail below, the present invention may specifically be used for tracking positions and/or motions of a person, such as for the purpose of controlling machines, gaming or simulation of sports. In this or other embodiments, specifically, the object may be selected from the group consisting of: an article of sports equipment, preferably an article selected from the group consisting of a racket, a club, a bat; an article of clothing; a hat; a shoe.

Thus, generally, the devices according to the present invention, such as the detector, may be applied in various fields of uses. Specifically, the detector may be applied for a purpose of use, selected from the group consisting of: a position measurement in traffic technology; an entertainment application; a security application; a human-machine interface application; a tracking application; a photography application; a mapping application for generating maps of at least one space, such as at least one space selected from the group of a room, a building and a street; a mobile application; a webcam; an audio device; a dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing, logistics, surveillance, or maintenance technology.

The devices according to the present invention may be used in mobile phones, tablet computers, laptops, smart panels or other stationary or mobile or wearable computer or communication applications. Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning and/or detecting environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in webcams or other peripheral devices for computing applications. Thus, as an example, the devices according to the present invention may be used in combination with software for imaging, recording, surveillance, scanning or motion detection. As outlined in the context of the human-machine interface and/or the entertainment device, the devices according to the present invention are particularly useful for giving commands by facial expressions and/or body expressions. The devices according to the present invention can be combined with other input generating devices like e.g. mouse, keyboard, touchpad, microphone etc. Further, the devices according to the present invention may be used in applications for gaming, such as by using a webcam. Further, the devices according to the present invention may be used in virtual training applications and/or video conferences. Further, devices according to the present invention may be used to recognize or track hands, arms, or objects used in a virtual or augmented reality application, especially when wearing head-mounted displays.

Further, the devices according to the present invention may be used in mobile audio devices, television devices and gaming devices, as partially explained above. Specifically, the devices according to the present invention may be used as controls or control devices for electronic devices, entertainment devices or the like. Further, the devices according to the present invention may be used for eye detection or eye tracking, such as in 2D- and 3D-display techniques, especially with transparent displays for augmented reality applications and/or for recognizing whether a display is being looked at and/or from which perspective a display is being looked at. Further, devices according to the present invention may be used to explore a room, boundaries, obstacles, in connection with a virtual or augmented reality application, especially when wearing a head-mounted display.

Further, the devices according to the present invention may be used in or as digital cameras such as DSC cameras and/or in or as reflex cameras such as SLR cameras. For these applications, reference may be made to the use of the devices according to the present invention in mobile applications such as mobile phones, as disclosed above.

Further, the devices according to the present invention may be used for security or surveillance applications. Thus, as an example, at least one device according to the present invention can be combined with one or more digital and/or analogue electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound detectors. The devices according to the present invention may further be combined with an active infrared light source to allow detection in low light surroundings. The devices according to the present invention are generally advantageous as compared to active detector systems, specifically since the devices according to the present invention avoid actively sending signals which may be detected by third parties, as is the case e.g. in radar applications, ultrasound applications, LIDAR or similar active detector devices. Thus, generally, the devices according to the present invention may be used for an unrecognized and undetectable tracking of moving objects. Additionally, the devices according to the present invention generally are less prone to manipulations and irritations as compared to conventional devices.

Further, given the ease and accuracy of 3D detection by using the devices according to the present invention, the devices according to the present invention generally may be used for facial, body and person recognition and identification. Therein, the devices according to the present invention may be combined with other detection means for identification or personalization purposes such as passwords, finger prints, iris detection, voice recognition or other means. Thus, generally, the devices according to the present invention may be used in security devices and other personalized applications.

Further, the devices according to the present invention may be used as 3D barcode readers for product identification.

In addition to the security and surveillance applications mentioned above, the devices according to the present invention generally can be used for surveillance and monitoring of spaces and areas. Thus, the devices according to the present invention may be used for surveying and monitoring spaces and areas and, as an example, for triggering or executing alarms in case prohibited areas are violated. Thus, generally, the devices according to the present invention may be used for surveillance purposes in building surveillance or museums, optionally in combination with other types of sensors, such as in combination with motion or heat sensors, in combination with image intensifiers or image enhancement devices and/or photomultipliers.

Further, the devices according to the present invention may be used in public spaces or crowded spaces to detect potentially hazardous activities such as commitment of crimes such as theft in a parking lot or unattended objects such as unattended baggage in an airport. Further, the devices according to the present invention may advantageously be applied in camera applications such as video and camcorder applications. Thus, the devices according to the present invention may be used for motion capture and 3D-movie recording. Therein, the devices according to the present invention generally provide a large number of advantages over conventional optical devices. Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use. Conventional optical systems having two or more lenses with high quality generally are voluminous, such as due to the general need for voluminous beam-splitters. Further, the devices according to the present invention generally may be used for focus/autofocus devices, such as autofocus cameras. Further, the devices according to the present invention may also be used in optical microscopy, especially in confocal microscopy.

Further, the devices according to the present invention generally are applicable in the technical field of automotive technology and transport technology. Thus, as an example, the devices according to the present invention may be used as distance and surveillance sensors, such as for adaptive cruise control, emergency brake assist, lane departure warning, surround view, blind spot detection, traffic sign detection, traffic sign recognition, lane recognition, rear cross traffic alert, light source recognition for adapting the head light intensity and range depending on approaching traffic or vehicles driving ahead, adaptive frontlighting systems, automatic control of high beam head lights, adaptive cut-off lights in front light systems, glare-free high beam front lighting systems, marking animals, obstacles, or the like by headlight illumination, rear cross traffic alert, and other driver assistance systems such as advanced driver assistance systems, or other automotive and traffic applications. Further, devices according to the present invention may be used in driver assistance systems anticipating maneuvers of the driver beforehand for collision avoidance or the like. Further, the devices according to the present invention can also be used for velocity and/or acceleration measurements, such as by analyzing a first and second time-derivative of position information gained by using the detector according to the present invention. This feature generally may be applicable in automotive technology, transportation technology or general traffic technology. Applications in other fields of technology are feasible. A specific application in an indoor positioning system may be the detection of positioning of passengers in transportation, more specifically to electronically control the use of safety systems such as airbags. The use of an airbag may be prevented in case the passenger is located as such, that the use of an airbag will cause a severe injury. Further, in vehicles such as cars, trains, planes or the like, especially in autonomous vehicles, devices according to the present invention may be used to determine whether a driver pays attention to the traffic or is distracted, or asleep, or tired, or incapable of driving such as due to the consumption of alcohol or the like.

In these or other applications, generally, the devices according to the present invention may be used as stand-alone devices or in combination with other sensor devices, such as in combination with radar and/or ultrasonic devices. Specifically, the devices according to the present invention may be used for autonomous driving and safety issues. Further, in these applications, the devices according to the present invention may be used in combination with infrared sensors, radar sensors, which are sonic sensors, two-dimensional cameras or other types of sensors. In these applications, the generally passive nature of the devices according to the present invention is advantageous. Thus, since the devices according to the present invention generally do not require emitting signals, the risk of interference of active sensor signals with other signal sources may be avoided. The devices according to the present invention specifically may be used in combination with recognition software, such as standard image recognition software. Thus, signals and data as provided by the devices according to the present invention typically are readily processable and, therefore, generally require lower calculation power than established 3D measurement systems. Given the low space demand, the devices according to the present invention such as cameras may be placed at virtually any place in a vehicle, such as on or behind a window screen, on a front hood, on bumpers, on lights, on mirrors or other places and the like. Various detectors according to the present invention such as one or more detectors based on the effect disclosed within the present invention can be combined, such as in order to allow autonomously driving vehicles or in order to increase the performance of active safety concepts. Thus, various devices according to the present invention may be combined with one or more other devices according to the present invention and/or conventional sensors, such as in the windows like rear window, side window or front window, on the bumpers or on the lights.

A combination of at least one device according to the present invention such as at least one detector according to the present invention with one or more rain detection sensors is also possible. This is due to the fact that the devices according to the present invention generally are advantageous over conventional sensor techniques such as radar, specifically during heavy rain. A combination of at least one device according to the present invention with at least one conventional sensing technique such as radar may allow for a software to pick the right combination of signals according to the weather conditions.

Further, the devices according to the present invention generally may be used as break assist and/or parking assist and/or for speed measurements. Speed measurements can be integrated in the vehicle or may be used outside the vehicle, such as in order to measure the speed of other cars in traffic control. Further, the devices according to the present invention may be used for detecting free parking spaces in parking lots.

Further, the devices according to the present invention may be used in the fields of medical systems and sports. Thus, in the field of medical technology, surgery robotics, e.g. for use in endoscopes, may be named, since, as outlined above, the devices according to the present invention may require a low volume only and may be integrated into other devices. Specifically, the devices according to the present invention having one lens, at most, may be used for capturing 3D information in medical devices such as in endoscopes. Further, the devices according to the present invention may be combined with an appropriate monitoring software, in order to enable tracking and analysis of movements. This may allow an instant overlay of the position of a medical device, such as an endoscope or a scalpel, with results from medical imaging, such as obtained from magnetic resonance imaging, x-ray imaging, or ultrasound imaging. These applications are specifically valuable e.g. in medical treatments where precise location information is important such as in brain surgery and long-distance diagnosis and tele-medicine. Further, the devices according to the present invention may be used in 3D-body scanning. Body scanning may be applied in a medical context, such as in dental surgery, plastic surgery, bariatric surgery, or cosmetic plastic surgery, or it may be applied in the context of medical diagnosis such as in the diagnosis of myofascial pain syndrome, cancer, body dysmorphic disorder, or further diseases. Body scanning may further be applied in the field of sports to assess ergonomic use or fit of sports equipment. Further, the devices according to the present invention may be used in wearable robots such as in exoskeletons or prosthesis or the like.

Body scanning may further be used in the context of clothing, such as to determine a suitable size and fitting of clothes. This technology may be used in the context of tailor-made clothes or in the context of ordering clothes or shoes from the internet or at a self-service shopping device such as a micro kiosk device or customer concierge device. Body scanning in the context of clothing is especially important for scanning fully dressed customers.

Further, the devices according to the present invention may be used in the context of people counting systems, such as to count the number of people in an elevator, a train, a bus, a car, or a plane, or to count the number of people passing a hallway, a door, an aisle, a retail store, a stadium, an entertainment venue, a museum, a library, a public location, a cinema, a theater, or the like. Further, the 3D-function in the people counting system may be used to obtain or estimate further information about the people that are counted such as height, weight, age, physical fitness, or the like. This information may be used for business intelligence metrics, and/or for further optimizing the locality where people may be counted to make it more attractive or safe. In a retail environment, the devices according to the present invention in the context of people counting may be used to recognize returning customers or cross shoppers, to assess shopping behavior, to assess the percentage of visitors that make purchases, to optimize staff shifts, or to monitor the costs of a shopping mall per visitor. Further, people counting systems may be used for anthropometric surveys. Further, the devices according to the present invention may be used in public transportation systems for automatically charging passengers depending on the length of transport. Further, the devices according to the present invention may be used in playgrounds for children, to recognize injured children or children engaged in dangerous activities, to allow additional interaction with playground toys, to ensure safe use of playground toys or the like.

Further, the devices according to the present invention may be used in construction tools, such as a range meter that determines the distance to an object or to a wall, to assess whether a surface is planar, to align objects or place objects in an ordered manner, or in inspection cameras for use in construction environments or the like.

Further, the devices according to the present invention may be applied in the field of sports and exercising, such as for training, remote instructions or competition purposes. Specifically, the devices according to the present invention may be applied in the fields of dancing, aerobic, football, soccer, basketball, baseball, cricket, hockey, track and field, swimming, polo, handball, volleyball, rugby, sumo, judo, fencing, boxing, golf, car racing, laser tag, battlefield simulation etc. The devices according to the present invention can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

Further, the devices according to the present invention may be used in the field of auto racing or car driver training or car safety training or the like to determine the position of a car or the track of a car, or the deviation from a previous track or an ideal track or the like.

The devices according to the present invention may further be used to support a practice of musical instruments, in particular remote lessons, for example lessons of string instruments, such as fiddles, violins, violas, celli, basses, harps, guitars, banjos, or ukuleles, keyboard instruments, such as pianos, organs, keyboards, harpsichords, harmoniums, or accordions, and/or percussion instruments, such as drums, timpani, marimbas, xylophones, vibraphones, bongos, congas, timbales, djembes or tablas.

The devices according to the present invention further may be used in rehabilitation and physiotherapy, in order to encourage training and/or in order to survey and correct movements. Therein, the devices according to the present invention may also be applied for distance diagnostics.

Further, the devices according to the present invention may be applied in the field of machine vision. Thus, one or more of the devices according to the present invention may be used e.g. as a passive controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects and humans better and faster and allow a safe interaction. Given the passive nature of the devices according to the present invention, the devices according to the present invention may be advantageous over active devices and/or may be used complementary to existing solutions like radar, ultrasound, 2D cameras, IR detection etc. One particular advantage of the devices according to the present invention is the low likelihood of signal interference. Therefore, multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible. In a manufacturing environment, the devices according to the present invention are especially useful for processing natural products such as food or wood, with a complex 3-dimensional structure to avoid large amounts of waste material. Further, devices according to the present invention may be used to monitor the filling level of tanks, silos etc. Further, devices according to the present invention may be used to inspect complex products for missing parts, incomplete parts, loose parts, low quality parts, or the like, such as in automatic optical inspection, such as of printed circuit boards, inspection of assemblies or sub-assemblies, verification of engineered components, engine part inspections, wood quality inspection, label inspections, inspection of medical devices, inspection of product orientations, packaging inspections, food pack inspections, or the like.

Further, the devices according to the present invention may be used in vehicles, trains, airplanes, ships, spacecraft and other traffic applications. Thus, besides the applications mentioned above in the context of traffic applications, passive tracking systems for aircraft, vehicles and the like may be named. The use of at least one device according to the present invention, such as at least one detector according to the present invention, for monitoring the speed and/or the direction of moving objects is feasible. Specifically, the tracking of fast moving objects on land, sea and in the air including space may be named. The at least one device according to the present invention, such as the at least one detector according to the present invention, specifically may be mounted on a still-standing and/or on a moving device. An output signal of the at least one device according to the present invention can be combined e.g. with a guiding mechanism for autonomous or guided movement of another object. Thus, applications for avoiding collisions or for enabling collisions between the tracked and the steered object are feasible. The devices according to the present invention generally are useful and advantageous due to the low calculation power required, the instant response and due to the passive nature of the detection system which generally is more difficult to detect and to disturb as compared to active systems, like e.g. radar. The devices according to the present invention are particularly useful but not limited to e.g. speed control and air traffic control devices. Further, the devices according to the present invention may be used in automated tolling systems for road charges.

The devices according to the present invention generally may be used in passive applications. Passive applications include guidance for ships in harbors or in dangerous areas, and for aircraft when landing or starting. Therein, fixed, known active targets may be used for precise guidance. The same can be used for vehicles driving on dangerous but well defined routes, such as mining vehicles. Further, the devices according to the present invention may be used to detect rapidly approaching objects, such as cars, trains, flying objects, animals, or the like. Further, the devices according to the present invention can be used for detecting velocities or accelerations of objects, or to predict the movement of an object by tracking one or more of its position, speed, and/or acceleration depending on time.

Further, as outlined above, the devices according to the present invention may be used in the field of gaming. Thus, the devices according to the present invention can be passive for use with multiple objects of the same or of different size, color, shape, etc., such as for movement detection in combination with software that incorporates the movement into its content. In particular, applications are feasible in implementing movements into graphical output. Further, applications of the devices according to the present invention for giving commands are feasible, such as by using one or more of the devices according to the present invention for gesture or facial recognition. The devices according to the present invention may be combined with an active system in order to work under e.g. low light conditions or in other situations in which enhancement of the surrounding conditions is required. Additionally or alternatively, a combination of one or more devices according to the present invention with one or more IR or VIS light sources is possible. A combination of a detector according to the present invention with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racket, a club, a gun, a knife, a wheel, a ring, a steering wheel, a bottle, a ball, a glass, a vase, a spoon, a fork, a cube, a dice, a figure, a puppet, a teddy, a beaker, a pedal, a switch, a glove, jewelry, a musical instrument or an auxiliary device for playing a musical instrument, such as a plectrum, a drumstick or the like. Other options are feasible.

Further, the devices according to the present invention may be used to detect and/or track objects that emit light by themselves, such as due to high temperature or further light emission processes. The light emitting part may be an exhaust stream or the like. Further, the devices according to the present invention may be used to track reflecting objects and analyze the rotation or orientation of these objects.

Further, the devices according to the present invention generally may be used in the field of building, construction and cartography. Thus, generally, one or more devices according to the present invention may be used in order to measure and/or monitor environmental areas, e.g. countryside or buildings. Therein, one or more devices according to the present invention may be combined with other methods and devices or can be used solely in order to monitor progress and accuracy of building projects, changing objects, houses, etc. The devices according to the present invention can be used for generating three-dimensional models of scanned environments, in order to construct maps of rooms, streets, houses, communities or landscapes, both from ground or from air. Potential fields of application may be construction, cartography, real estate management, land surveying or the like. As an example, the devices according to the present invention may be used in drones or multicopters to monitor buildings, production sites, chimneys, agricultural production environments such as fields, production plants, or landscapes, to support rescue operations, to support work in dangerous environments, to support fire brigades in a burning location indoors or outdoors, or to find or monitor one or more persons or animals, or the like, or for entertainment purposes, such as a drone following and recording one or more persons doing sports such as skiing or cycling or the like, which could be realized by following a helmet, a mark, a beacon device, or the like. Devices according to the present invention could be used recognize obstacles, follow a predefined route, follow an edge, a pipe, a building, or the like, or to record a global or local map of the environment. Further, devices according to the present invention could be used for indoor or outdoor localization and positioning of drones, for stabilizing the height of a drone indoors where barometric pressure sensors are not accurate enough, or for the interaction of multiple drones such as concertized movements of several drones or recharging or refueling in the air or the like.

Further, the devices according to the present invention may be used within an interconnecting network of home appliances such as CHAIN (Cedec Home Appliances Interoperating Network) to interconnect, automate, and control basic appliance-related services in a home, e.g. energy or load management, remote diagnostics, pet related appliances, child related appliances, child surveillance, appliances related surveillance, support or service to elderly or ill persons, home security and/or surveillance, remote control of appliance operation, and automatic maintenance support. Further, the devices according to the present invention may be used in heating or cooling systems such as an air-conditioning system, to locate which part of the room should be brought to a certain temperature or humidity, especially depending on the location of one or more persons. Further, the devices according to the present invention may be used in domestic robots, such as service or autonomous robots which may be used for household chores. The devices according to the present invention may be used for a number of different purposes, such as to avoid collisions or to map the environment, but also to identify a user, to personalize the robot's performance for a given user, for security purposes, or for gesture or facial recognition. As an example, the devices according to the present invention may be used in robotic vacuum cleaners, floor-washing robots, dry-sweeping robots, ironing robots for ironing clothes, animal litter robots, such as dog or cat litter robots, charging robot for electrical vehicles, security robots that detect intruders, robotic lawn mowers, automated pool cleaners, rain gutter cleaning robots, robotic shopping carts, luggage carrying robots, line following robots, laundry robots, ironing robots, window washing robots, toy robots, patient monitoring robots, baby monitoring robots, elderly monitoring robots, children monitoring robots, transport robots, telepresence robots, professional service robots, programmable toy robots, pathfinder robots, social robots providing company to less mobile people, following robots, smart card following robots, psychotherapy robots, or robots translating speech to sign language or sign language to speech. In the context of less mobile people, such as elderly persons, household robots with the devices according to the present invention may be used for picking up objects, transporting objects, and interacting with the objects and the user in a safe way. Further, the devices according to the present invention may be used in humanoid robots, especially in the context of using humanoid hands to pick up or hold or place objects. Further, the devices according to the present invention may be used in combination with audio interfaces especially in combination with household robots which may serve as a digital assistant with interfaces to online or offline computer applications. Further, the devices according to the present invention may be used in robots that can control switches and buttons in industrial and household purposes. Further, the devices according to the present invention may be used in smart home robots such as Mayfield's Kuri. Further the devices according to the present invention may be used in robots operating with hazardous materials or objects or in dangerous environments. As a non-limiting example, the devices according to the present invention may be used in robots or unmanned remote-controlled vehicles to operate with hazardous materials such as chemicals or radioactive materials especially after disasters, or with other hazardous or potentially hazardous objects such as mines, unexploded arms, or the like, or to operate in or to investigate insecure environments such as near burning objects or post disaster areas or for manned or unmanned rescue operations in the air, in the sea, underground, or the like.

Further, devices according to the present invention may be used for the inspection of adhesive beads, sealing beads, or the like, such as to recognize disruptions, slubs, contractions, asymmetries, local defects, or the like. Further, devices according to the present invention may be used to count objects such as dry fruits on a conveyer belt, such as in difficult situations, such as when fruit of similar color and shape may be in direct contact with each other. Further, devices according to the present invention may be used in quality control of die cast or injection molded parts such as to ensure flawless casting or molding, recognize surface damages, worn out toolings or the like. Further, devices according to the present invention may be used for laser-scribing such as for quality control and positioning of the laser. Further, devices according to the present invention may be used for sorting systems, such as to detect position, rotation, and shape of an object, compare it to a database of objects, and classify the object. Further, devices according to the present invention may be used for stamping part inspection, packaging inspection, such as food and pharma packaging inspection, filament inspection, or the like.

Further, devices according to the present invention may be used for navigation purposes, where Global Positioning Systems (GPS) are not sufficiently reliable. GPS signals commonly use radio waves that are can be blocked or difficult to receive indoors or outdoors in valleys or in forests below the treeline. Further, especially in unmanned autonomous vehicles, the weight of the system may be critical. Especially unmanned autonomous vehicles need high-speed position data for reliable feedback and stability of their control systems. Using devices according to the present invention may allow short time response and positioning without adding weight due to a heavy device.

Further, the devices according to the present invention may be used in household, mobile or entertainment devices, such as a refrigerator, a microwave, a washing machine, a window blind or shutter, a household alarm, an air condition devices, a heating device, a television, an audio device, a smart watch, a mobile phone, a phone, a dishwasher, a stove or the like, to detect the presence of a person, to monitor the contents or function of the device, or to interact with the person and/or share information about the person with further household, mobile or entertainment devices.

Further, the devices according to the present invention may be used to support elderly or disabled persons or persons with limited or no vision, such as in household chores or at work such as in devices for holding, carrying, or picking objects, or in a safety system with optical or acoustical signals signaling obstacles in the environment.

The devices according to the present invention may further be used in agriculture, for example to detect and sort out vermin, weeds, and/or infected crop plants, fully or in parts, wherein crop plants may be infected by fungus or insects. Further, for harvesting crops, the devices according to the present invention may be used to detect animals, such as deer, which may otherwise be harmed by harvesting devices. Further, the devices according to the present invention may be used to monitor the growth of plants in a field or greenhouse, in particular to adjust the amount of water or fertilizer or crop protection products for a given region in the field or greenhouse or even for a given plant. Further, in agricultural biotechnology, the devices according to the present invention may be used to monitor the size and shape of plants.

Further, devices according to the present invention may be used to guide users during a shaving, hair cutting, or cosmetics procedure, or the like. Further, devices according to the present invention may be used to record or monitor what is played on an instrument, such as a violin. Further, devices according to the present invention may be used in smart household appliances such as a smart refrigerator, such as to monitor the contents of the refrigerator and transmit notifications depending on the contents. Further, devices according to the present invention may be used for monitoring or tracking populations of humans, animals, or plants, such as deer or tree populations in forests. Further, devices according to the present invention may be used in harvesting machines, such as for harvesting crops, flowers or fruits, such as grapes, corn, hops, apples, grains, rice, strawberries, asparagus, tulips, roses, soy beans, or the like. Further, devices according to the present invention may be used to monitor the growth of plants, animals, algae, fish, or the like, such as in breeding, food production, agriculture or research applications, to control irrigation, fertilization, humidity, temperature, use of herbicides, insecticides, fungicides, rodenticides, or the like. Further, devices according to the present invention may be used in feeding machines for animals or pets, such as for cows, pigs, cats, dogs, birds, fish, or the like. Further, devices according to the present invention may be used in animal product production processes, such as for collecting milk, eggs, fur, meat, or the like, such as in automated milking or butchering processes. Further, devices according to the present invention may be used for automated seeding machines, or sowing machines, or planting machines such as for planting corn, garlic, trees, salad or the like. Further, devices according to the present invention may be used to assess or monitor weather phenomena, such as clouds, fog, or the like, or to warn from danger of avalanches, tsunamis, gales, earthquakes, thunder storms, or the like. Further, devices according to the present invention may be used to measure motions, shocks, concussions, or the like such as to monitor earthquake risk. Further, devices according to the present invention may be used in traffic technology to monitor dangerous crossings, to control traffic lights depending on traffic, to monitor public spaces, to monitor roads, gyms, stadiums, ski resorts, public events, or the like. Further, devices according to the present invention may be used in medical applications such as to monitor or analyze tissues, medical or biological assays, changes in tissues such as in moles or melanoma or the like, to count bacteria, blood cells, cells, algae, or the like, for retina scans, breath or pulse measurements, gastroscopy, patient surveillance, or the like. Further, devices according to the present invention may be used to monitor the shape, size, or circumference of drops, streams, jets, or the like or to analyze, assess, or monitor profiles or gas or liquid currents such as in a wind channel, or the like. Further, devices according to the present invention may be used to warn drivers such as car or train drivers when they are getting sick or tired or the like. Further, devices according to the present invention may be used in material testing to recognize strains or tensions or fissures, or the like. Further, devices according to the present invention may be used in sailing to monitor and optimize sail positions such as automatically. Further, devices according to the present invention may be used for fuel level gauges.

Further, the devices according to the present invention may be combined with sensors to detect chemicals or pollutants, electronic nose chips, microbe sensor chips to detect bacteria or viruses or the like, Geiger counters, tactile sensors, heat sensors, or the like. This may for example be used in constructing smart robots which are configured for handling dangerous or difficult tasks, such as in treating highly infectious patients, handling or removing highly dangerous substances, cleaning highly polluted areas, such as highly radioactive areas or chemical spills, or for pest control in agriculture.

One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously. Further, the devices according to the present invention may be used in inspections and maintenance, such as pipeline inspection gauges. Further, in a production environment, the devices according to the present invention may be used to work with objects of a badly defined shape such as naturally grown objects, such as sorting vegetables or other natural products by shape or size or cutting products such as meat or objects that are manufactured with a precision that is lower than the precision needed for a processing step.

Further, the devices according to the present invention may be used in local navigation systems to allow autonomously or partially autonomously moving vehicles or multicopters or the like through an indoor or outdoor space. A non-limiting example may comprise vehicles moving through an automated storage for picking up objects and placing them at a different location. Indoor navigation may further be used in shopping malls, retail stores, museums, airports, or train stations, to track the location of mobile goods, mobile devices, baggage, customers or employees, or to supply users with a location specific information, such as the current position on a map, or information on goods sold, or the like.

Further, the devices according to the present invention may be used to ensure safe driving of motorcycles such as driving assistance for motorcycles by monitoring speed, inclination, upcoming obstacles, unevenness of the road, or curves or the like. Further, the devices according to the present invention may be used in trains or trams to avoid collisions.

Further, the devices according to the present invention may be used in handheld devices, such as for scanning packaging or parcels to optimize a logistics process. Further, the devices according to the present invention may be used in further handheld devices such as personal shopping devices, RFID-readers, handheld devices for use in hospitals or health environments such as for medical use or to obtain, exchange or record patient or patient health related information, smart badges for retail or health environments, or the like.

As outlined above, the devices according to the present invention may further be used in manufacturing, quality control or identification applications, such as in product identification or size identification (such as for finding an optimal place or package, for reducing waste etc.). Further, the devices according to the present invention may be used in logistics applications. Thus, the devices according to the present invention may be used for optimized loading or packing containers or vehicles. Further, devices according to the present invention may be recalibrated using bar codes, QR-codes or prerecorded symbols of known size by using the at least one image matrix and comparing the prerecorded size with a measured property of the recorded image of the bar code, QR code or prerecorded symbol, such as by comparing the width or height of the symbol with a prerecorded value. Further, the devices according to the present invention may be used for monitoring or controlling of surface damages in the field of manufacturing, for monitoring or controlling rental objects such as rental vehicles, and/or for insurance applications, such as for assessment of damages. Further, the devices according to the present invention may be used for identifying a size of material, object or tools, such as for optimal material handling, especially in combination with robots. Further, the devices according to the present invention may be used for process control in production, e.g. for observing filling level of tanks. Further, the devices according to the present invention may be used for maintenance of production assets like, but not limited to, tanks, pipes, reactors, tools etc. Further, the devices according to the present invention may be used for analyzing 3D-quality marks. Further, the devices according to the present invention may be used in manufacturing tailor-made goods such as tooth inlays, dental braces, prosthesis, clothes or the like. The devices according to the present invention may also be combined with one or more 3D-printers for rapid prototyping, 3D-copying or the like. Further, the devices according to the present invention may be used for detecting the shape of one or more articles, such as for anti-product piracy and for anti-counterfeiting purposes.

Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term photography generally refers to the technology of acquiring image information of at least one object. As further used herein, a camera generally is a device adapted for performing photography. As further used herein, the term digital photography generally refers to the technology of acquiring image information of at least one object by using a plurality of light-sensitive elements adapted to generate electrical signals indicating an intensity and/or color of illumination, preferably digital electrical signals. As further used herein, the term 3D photography generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

As outlined above and as will be outlined in further detail below, the present invention preferably may be applied in the field of human-machine interfaces, in the field of sports and/or in the field of computer games. Thus, preferably, the object may be selected from the group consisting of: an article of sports equipment, preferably an article selected from the group consisting of a racket, a club, a bat, an article of clothing, a hat, a shoe. Other embodiments are feasible.

As used herein, the object generally may be an arbitrary object, chosen from a living object and a non-living object.

Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

With regard to the coordinate system for determining the position of the object, which may be a coordinate system of the detector, the detector may constitute a coordinate system in which an optical axis of the detector forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The detector may be a device configured for providing at least one item of information on the position of the at least one object and/or a part thereof. Thus, the position may refer to an item of information fully describing the position of the object or a part thereof, preferably in the coordinate system of the detector, or may refer to a partial information, which only partially describes the position. The detector generally may be a device adapted for detecting light beams, such as the light beams propagating from the beacon devices towards the detector.

The evaluation device and the detector may fully or partially be integrated into a single device. Thus, generally, the evaluation device also may form part of the detector. Alternatively, the evaluation device and the detector may fully or partially be embodied as separate devices. The detector may comprise further components.

The detector may be a stationary device or a mobile device. Further, the detector may be a stand-alone device or may form part of another device, such as a computer, a vehicle or any other device. Further, the detector may be a hand-held device. Other embodiments of the detector are feasible.

The detector specifically may be used to record a light-field behind a lens or lens system of the detector, comparable to a plenoptic or light-field camera. Thus, specifically, the detector may be embodied as a light-field camera adapted for acquiring images in multiple focal planes, such as simultaneously. The term light-field, as used herein, generally refers to the spatial light propagation of light inside the detector such as inside camera. The detector according to the present invention, specifically having a stack of optical sensors, may have the capability of directly recording a light-field within the detector or camera, such as behind a lens. The plurality of sensors may record images at different distances from the lens. Using, e.g., convolution-based algorithms such as "depth from focus" or "depth from defocus", the propagation direction, focus points, and spread of the light behind the lens can be modeled. From the modeled propagation of light behind the lens, images at various distances to the lens can be extracted, the depth of field can be optimized, pictures that are in focus at various distances can be extracted, or distances of objects can be calculated. Further information may be extracted.

The use of several optical sensors further allows for correcting lens errors in an image processing step after recording the images. Optical instruments often become expensive and challenging in construction, when lens errors need to be corrected. These are especially problematic in microscopes and telescopes. In microscopes, a typical lens error is that rays of varying distance to the optical axis are distorted differently (spherical aberration). In telescopes, varying the focus may occur from differing temperatures in the atmosphere. Static errors such as spherical aberration or further errors from production may be corrected by determining the errors in a calibration step and then using a fixed image processing such as fixed set of pixels and sensor, or more involved processing techniques using light propagation information. In cases in which lens errors are strongly time-dependent, i.e. dependent on weather conditions in telescopes, the lens errors may be corrected by using the light propagation behind the lens, calculating extended depth of field images, using depth from focus techniques, and others.

The detector according to the present invention may further allow for color detection. For color detection, a plurality of optical sensors having different spectral properties may be used, and sensor signals of these optical sensors may be compared. Further, the devices according to the present invention may be used in the context of gesture recognition. In this context, gesture recognition in combination with devices according to the present invention may, in particular, be used as a human-machine interface for transmitting information via motion of a body, of body parts or of objects to a machine. Herein, the information may, preferably, be transmitted via a motion of hands or hand parts, such as fingers, in particular, by pointing at objects, applying sign language, such as for deaf people, making signs for numbers, approval, disapproval, or the like, by waving the hand, such as when asking someone to approach, to leave, or to greet a person, to press an object, to take an object, or, in the field of sports or music, in a hand or finger exercise, such as a warm-up exercise. Further, the information may be transmitted by motion of arms or legs, such as rotating, kicking, grabbing, twisting, rotating, scrolling, browsing, pushing, bending, punching, shaking, arms, legs, both arms, or both legs, or a combination of arms and legs, such as for a purpose of sports or music, such as for entertainment, exercise, or training function of a machine. Further, the information may be transmitted by motion of the whole body or major parts thereof, such as jumping, rotating, or making complex signs, such as sign language used at airports or by traffic police in order to transmit information, such as "turn right", "turn left", "proceed", "slow down", "stop", or "stop engines", or by pretending to swim, to dive, to run, to shoot, or the like, or by making complex motions or body positions such as in yoga, pilates, judo, karate, dancing, or ballet. Further, the information may be transmitted by using a real or mock-up device for controlling a virtual device corresponding to the mock-up device, such as using a mock-up guitar for controlling a virtual guitar function in a computer program, using a real guitar for controlling a virtual guitar function in a computer program, using a real or a mock-up book for reading an e-book or moving pages or browsing through in a virtual document, using a real or mock-up pen for drawing in a computer program, or the like. Further, the transmission of the information may be coupled to a feedback to the user, such as a sound, a vibration, or a motion.

In the context of music and/or instruments, devices according to the present invention in combination with gesture recognition may be used for exercising purposes, control of instruments, recording of instruments, playing or recording of music via use of a mock-up instrument or by only pretending to have a instrument present such as playing air guitar, such as to avoid noise or make recordings, or, for conducting of a virtual orchestra, ensemble, band, big band, choir, or the like, for practicing, exercising, recording or entertainment purposes or the like.

Further, in the context of safety and surveillance, devices according to the present invention in combination with gesture recognition may be used to recognize motion profiles of persons, such as recognizing a person by the way of walking or moving the body, or to use hand signs or movements or signs or movements of body parts or the whole body as access or identification control such as a personal identification sign or a personal identification movement.

Further, in the context of smart home applications or internet of things, devices according to the present invention in combination with gesture recognition may be used for central or non-central control of household devices which may be part of an interconnecting network of home appliances and/or household devices, such as refrigerators, central heating, air condition, microwave ovens, ice cube makers, or water boilers, or entertainment devices, such as television sets, smart phones, game consoles, video recorders, DVD players, personal computers, laptops, tablets, or combinations thereof, or a combination of household devices and entertainment devices.

Further, in the context of virtual reality or of augmented reality, devices according to the present invention in combination with gesture recognition may be used to control movements or function of the virtual reality application or of the augmented reality application, such as playing or controlling a game using signs, gestures, body movements or body part movements or the like, moving through a virtual world, manipulating virtual objects, practicing, exercising or playing sports, arts, crafts, music or games using virtual objects such as a ball, chess figures, go stones, instruments, tools, brushes.

Further, in the context of medicine, devices according to the present invention in combination with gesture recognition may be used to support rehabilitation training, remote diagnostics, or to monitor or survey surgery or treatment, to overlay and display medical images with positions of medical devices, or to overlay display prerecorded medical images such as from magnetic resonance tomography or x-ray or the like with images from endoscopes or ultra sound or the like that are recorded during a surgery or treatment.

Further, in the context of manufacturing and process automation, devices according to the present invention in combination with gesture recognition may be used to control, teach, or program robots, drones, unmanned autonomous vehicles, service robots, movable objects, or the like, such as for programming, controlling, manufacturing, manipulating, repairing, or teaching purposes, or for remote manipulating of objects or areas, such as for safety reasons, or for maintenance purposes.

Further, in the context of business intelligence metrics, devices according to the present invention in combination with gesture recognition may be used for people counting, surveying customer movements, areas where customers spend time, objects, customers test, take, probe, or the like.

Further, devices according to the present invention may be used in the context of do-it-yourself or professional tools, especially electric or motor driven tools or power tools, such as drilling machines, saws, chisels, hammers, wrenches, staple guns, disc cutters, metals shears and nibblers, angle grinders, die grinders, drills, hammer drills, heat guns, wrenches, sanders, engravers, nailers, jig saws, biscuit joiners, wood routers, planers, polishers, tile cutters, washers, rollers, wall chasers, lathes, impact drivers, jointers, paint rollers, spray guns, morticers, or welders, in particular, to support precision in manufacturing, keeping a minimum or maximum distance, or for safety measures.

Further, the devices according to the present invention may be used to aid visually impaired persons. Further, devices according to the present invention may be used in touch screen such as to avoid direct contact such as for hygienic reasons, which may be used in retail environments, in medical applications, in production environments, or the like. Further, devices according to the present invention may be used in agricultural production environments such as in stable cleaning robots, egg collecting machines, milking machines, harvesting machines, farm machinery, harvesters, forwarders, combine harvesters, tractors, cultivators, ploughs, destoners, harrows, strip tills, broadcast seeders, planters such as potato planters, manure spreaders, sprayers, sprinkler systems, swathers, balers, loaders, forklifts, mowers, or the like.

Further, devices according to the present invention may be used for selection and/or adaption of clothing, shoes, glasses, hats, prosthesis, dental braces, for persons or animals with limited communication skills or possibilities, such as children or impaired persons, or the like. Further, devices according to the present invention may be used in the context of warehouses, logistics, distribution, shipping, loading, unloading, smart manufacturing, industry 4.0, or the like. Further, in a manufacturing context, devices according to the present invention may be used in the context of processing, dispensing, bending, material handling, or the like.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The at least one evaluation device may be adapted to perform at least one computer program, such as at least one computer program adapted for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as CameraLink. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+ RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information. Further, devices according to the present invention may be used in 360° digital cameras or surround view cameras.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

A further embodiment of the present invention may be an incorporation of the detector or a part thereof such as the evaluation device and/or the data processing device in a device for use in automotive, for use in autonomous driving or for use in car safety systems such as Daimler's Intelligent Drive system, wherein, as an example, a device incorporating one or more of the optical sensors, optionally one or more optical systems, the evaluation device, optionally a communication device, optionally a data processing device, optionally one or more interfaces, optionally a system on a chip, optionally one or more display devices, or optionally further electronic devices may be part of a vehicle, a car, a truck, a train, a bicycle, an airplane, a ship, a motorcycle. In automotive applications, the integration of the device into the automotive design may necessitate the integration of the optical sensor, optionally optics, or device at minimal visibility from the exterior or interior. The detector or a part thereof such as the evaluation device and/or the data processing device may be especially suitable for such integration into automotive design.

As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term light beam generally may refer to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams such as a linear combination of Gaussian light beams, which may be characterized by one or more Gaussian beam parameters, such as one or more of a beam waist, a Rayleigh-length or any other beam parameter or combination of beam parameters suited to characterize a development of a beam diameter and/or a beam propagation in space.

The detector according to the present invention may further be combined with one or more other types of sensors or detectors. Thus, the detector may further comprise at least one additional detector. The at least one additional detector may be adapted for detecting at least one parameter, such as at least one of: a parameter of a surrounding environment, such as a temperature and/or a brightness of a surrounding environment; a parameter regarding a position and/or orientation of the detector; a parameter specifying a state of the object to be detected, such as a position of the object, e.g. an absolute position of the object and/or an orientation of the object in space. Thus, generally, the principles of the present invention may be combined with other measurement principles in order to gain additional information and/or in order to verify measurement results or reduce measurement errors or noise.

The human-machine interface may comprise a plurality of beacon devices which are adapted to be at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices in his or her hands and/or by wearing the at least one beacon device and/or a garment containing the beacon device on a body part.

The beacon device generally may be an arbitrary device which may be detected by the at least one detector and/or which facilitates detection by the at least one detector. Thus, as outlined above or as will be outlined in further detail below, the beacon device may be an active beacon device adapted for generating the at least one light beam to be detected by the detector, such as by having one or more illumination sources for generating the at least one light beam. Additionally or alternatively, the beacon device may fully or partially be designed as a passive beacon device, such as by providing one or more reflective elements adapted to reflect a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and of which the orientation may be recognized by the detector device. Thus, generally, the present invention also refers to a detector system comprising at least one detector device according to the present invention and which, further, may comprise at least one object, wherein the beacon devices are one of attached to the object, held by the object and integrated into the object. As an example, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be adapted in such a way that the detector device generates at least one item of information on the position of the user or of at least one body part of the user. Specifically in case a manner of attachment of the at least one beacon device to the user is known, by evaluating the position of the at least one beacon device, at least one item of information on a position and/or an orientation of the user or of a body part of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source adapted to generate at least one light beam to be transmitted to the detector, preferably at least one light beam having known beam properties. Additionally or alternatively, the beacon device may comprise at least one reflector adapted to reflect light generated by an illumination source, thereby generating a reflected light beam to be transmitted to the detector.

The object, which may form part of the detector system, may generally have an arbitrary shape. Preferably, the object being part of the detector system, as outlined above, may be a control element which may be handled by a user, such as manually. As an example, the control element may be or may comprise at least one element selected from the group consisting of: a glove, a jacket, a hat, shoes, trousers and a suit, a stick that may be held by hand, a bat, a club, a racket, a cane, a toy, such as a toy gun. Thus, as an example, the detector system may be part of the human-machine interface and/or of the entertainment device.

As used herein, an entertainment device is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device. The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a tracking system is a device which is adapted to gather information on a series of past positions of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is adapted to track a series of positions of the object at specific points in time, such as by recording groups of data or data pairs, each group of data or data pair comprising at least one position information and at least one time information.

The tracking system may further comprise the at least one detector system according to the present invention. Thus, besides the at least one detector and the at least one evaluation device and the optional at least one beacon device, the tracking system may further comprise the object itself or a part of the object, such as at least one control element comprising the beacon devices or at least one beacon device, wherein the control element is directly or indirectly attachable to or integratable into the object to be tracked.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

Overall, in the context of the present invention, the following embodiments are regarded as preferred:

Embodiment 1: A detector for determining a position of at least one object, the detector comprising
- at least one sensor element having a matrix of optical sensors, the optical sensors each having a light-sensitive area, wherein the sensor element is configured to determine at least one reflection image;
- at least one evaluation device, wherein the evaluation device is configured to select at least one reflection feature of the reflection image at at least one first image position in the reflection image, wherein the evaluation device is configured for determining at least one longitudinal coordinate z of the selected reflection feature by optimizing at least one blurring function $f_a$, wherein the evaluation device is configured to determine at least one reference feature in at least one reference image at at least one second image position in the reference image corresponding to the at least one reflection feature, wherein the reference image and the reflection image are determined at two different spatial configurations, wherein the spatial configurations differ by a relative spatial constellation, wherein the evaluation device is configured to determine the relative spatial constellation from the longitudinal coordinate z and the first and second image positions.

Embodiment 2: The detector according to the preceding embodiment, wherein the longitudinal coordinate z is determined by using at least one convolution-based algorithm such as a depth from defocus algorithm.

Embodiment 3: The detector according to any one of the preceding embodiments, wherein the blurring function is optimized by varying the parameters of the at least one blurring function.

Embodiment 4: The detector according to the preceding embodiment, wherein the reflection image is a blurred image $i_b$, wherein evaluation device is configured to reconstruct the longitudinal coordinate z from the blurred image $i_b$ and the blurring function $f_a$.

Embodiment 5: The detector according to the preceding embodiment, wherein the longitudinal coordinate z is determined by minimizing a difference between the blurred image $i_b$ and the convolution of the blurring function $f_a$ with a further image $i'_b$, $$\min\|(i'_b * f_a(\sigma(z)) - i_b)\|,$$

by varying the parameters σ of the blurring function.

Embodiment 6: The detector according to the preceding embodiment, wherein the further image is a blurred or sharp image.

Embodiment 7: The detector according to any one of the preceding embodiments, wherein the at least one blurring function $f_a$ is a function, or a composite function composed from at least one function from the group consisting of: a Gaussian, a sinc function, a pillbox function, a square function, a Lorentzian function, a radial function, a polynomial, a Hermite polynomial, a Zernike polynomial, a Legendre polynomial.

Embodiment 8: The detector according to any one of the preceding embodiments, wherein the relative spatial constellation is at least one constellation selected from the group consisting of: a relative spatial orientation; a relative angle position; a relative distance; a relative displacement; relative movement.

Embodiment 9: The detector according to any one of the preceding embodiments, wherein the detector comprises at least two sensor elements separated by a relative spatial constellation, wherein at least one first sensor element is adapted to record the reference image and at least one second sensor element is adapted to record the reflection image.

Embodiment 10: The detector according to any one of the preceding embodiments, wherein the detector is configured to record the reflection image and the reference image using the same matrix of optical sensors at different times.

Embodiment 11: The detector according to the preceding embodiment, wherein the evaluation device is configured to determine at least one scaling factor for the relative spatial constellation.

Embodiment 12: The detector according to any one of the preceding embodiments, wherein the evaluation device is configured to determine a displacement of the reference feature and the reflection feature.

Embodiment 13: The detector according to the preceding embodiment, wherein the evaluation device is configured to determine at least one triangulation longitudinal coordinate $z_{triang}$ of the object using a pre-defined relationship between the triangulation longitudinal coordinate $z_{triang}$ of the object and the displacement.

Embodiment 14: The detector according to any one of the two preceding embodiments, wherein the evaluation device is configured to determine an actual relationship between the longitudinal coordinate z and the displacement considering the determined relative spatial constellation, wherein the evaluation device is configured to adjust the pre-defined relationship depending on the actual relationship.

Embodiment 15: The detector according to the preceding embodiment, wherein the evaluation device is configured to replace the pre-defined relationship by the actual relationship and/or the evaluation is configured to determine a moving average and to replace the pre-defined relationship by the moving average.

Embodiment 16: The detector according to any one of the three preceding embodiments, wherein the evaluation device is configured to determine a difference between the longitudinal coordinate z and the triangulation coordinate $z_{triang}$, wherein the evaluation device is configured to compare the determined difference to at least one threshold and to adjust the pre-defined relationship in case the determined difference is above or equal to the threshold.

Embodiment 17: The detector according to any one of the four preceding embodiments, wherein the evaluation device is configured to determine an estimate of a corrected relative spatial relationship using a mathematical model including parameters such as various sensor signals and/or positions and/or the image positions and/or the system properties and/or longitudinal coordinates, a displacement on the sensor d, a focal length of a transfer device f, temperature, $z_{triang}$, the baseline b, an angle between the illumination source and the baseline β, the longitudinal coordinate z, or the like, wherein the mathematical model is at least one mathematical model selected from the group consisting of: a Kalman filter, a linear quadratic estimate, a Kalman-Bucy-Filter, a Stratonovich-Kalman-Bucy-Filter, a Kalman-Bucy-Stratonovich-Filter, a minimum variance estimator, a Bayesian estimator, a Best linear unbiased estimator, an invariant estimator, a Wiener filter, or the like.

Embodiment 18: The detector according to any one of the preceding embodiments, wherein the evaluation device is configured to determine at least one longitudinal region, wherein the longitudinal region is given by the longitudinal coordinate z and an error interval ±ε, wherein the evaluation device is configured to determine at least one displacement region in the reference image corresponding to the longitudinal region, wherein the evaluation device is configured to determine an epipolar line in the reference image, wherein the displacement region extends along the epipolar line, wherein the evaluation device is configured to determine the reference feature along the epipolar line corresponding to the longitudinal coordinate z and to determine an extent of the displacement region along the epipolar line corresponding to the error interval ±ε.

Embodiment 19: The detector according to the preceding embodiment, wherein the evaluation device is configured to perform the following steps:
  Determining a displacement region for the second image position of each reflection feature;
  Assigning an epipolar line to the displacement region of each reflection feature such as by assigning the epipolar line closest to a displacement region and/or within a displacement region and/or closest to a displacement region along a direction orthogonal to the epipolar line;
  Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Embodiment 20: The detector according to any one of the two preceding embodiments, wherein the evaluation device is configured to match the reflection feature with the at least one reference feature within the displacement region.

Embodiment 21: The detector according to any one of the preceding embodiments, wherein the sensor element is configured to determine at least one second reflection image, wherein the evaluation device is configured to select at least one second reflection feature of the second reflection image at at least one third image position in the second reflection image and to determine at least one second longitudinal coordinate of the second reflection feature by optimizing the at least one blurring function $f_a$, wherein the evaluation device is adapted to determine at least one second reference feature corresponding to the at least one second reflection feature in at least one second reference image at at least one fourth image position in the second reference image, wherein the second reference image and the second reflection image are determined at two second different spatial configurations, wherein the spatial configurations differ by an actual relative spatial constellation, wherein the evaluation device is configured to determine the actual relative spatial constellation from the second longitudinal coordinate and the third and fourth image positions, wherein the evaluation device is configured to compare the relative spatial constellation and the actual relative spatial constellation.

Embodiment 22: The detector according to the preceding embodiment, wherein the evaluation device is configured to adjust the relative spatial constellation depending on the actual relative spatial constellation.

Embodiment 23: The detector according to the preceding embodiment, wherein the evaluation device is configured to replace the relative spatial constellation by the actual relative constellation and/or the evaluation is configured to determine a moving average and to replace the relative spatial constellation by the moving average.

Embodiment 24: The detector according to any one of the two preceding embodiments, wherein the evaluation device is configured to determine a difference between the relative spatial constellation and the actual relative spatial constellation, wherein the evaluation device is adapted to compare the determined difference to at least one threshold and to adjust the relative spatial constellation in case the determined difference is above or equal to the threshold.

Embodiment 25: The detector according to any one of the preceding embodiments, wherein the detector comprises at least one illumination source, wherein the illumination source is adapted to generate at least one illumination pattern for illumination of the object, wherein the illumination pattern comprises at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines.

Embodiment 26: The detector according to any one of the preceding embodiments, wherein the detector comprises at least one temperature determining unit, wherein the temperature determining unit is configured to determine at least one temperature value of the detector.

Embodiment 27: The detector according to the preceding embodiment, wherein the evaluation device is configured to determine the relative spatial constellation considering the temperature value and/or to adjust the relative spatial constellation dependent on the temperature value.

Embodiment 28: A detector system for determining a position of at least one object, the detector system comprising at least one detector according to any one of the preceding embodiments, the detector system further comprising at least one beacon device adapted to direct at least one light beam towards the detector, wherein the beacon device is at least one of attachable to the object, holdable by the object and integratable into the object.

Embodiment 29: A human-machine interface for exchanging at least one item of information between a user and a machine, wherein the human-machine interface comprises at least one detector system according to the preceding embodiment, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

Embodiment 30: An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 31: A tracking system for tracking a position of at least one movable object, the tracking system comprising at least one detector system according to any one of the preceding embodiments referring to a detector system, the tracking system further comprising at least one track controller, wherein the track controller is adapted to track a series of positions of the object at specific points in time.

Embodiment 32: A scanning system for determining a depth profile of a scenery, the scanning system comprising at least one detector according to any of the preceding embodiments referring to a detector, the scanning system further comprising at least one illumination source adapted to scan the scenery with at least one light beam.

Embodiment 33: A camera for imaging at least one object, the camera comprising at least one detector according to any one of the preceding embodiments referring to a detector.

Embodiment 34: An inertial measurement unit for use in an electronic device, wherein the inertial measurement unit is adapted to receive data determined by at least one detector according to any one of the preceding embodiments referring to a detector, wherein the inertial measurement unit further is adapted to receive data determined by at least one further sensor selected from the group consisting of: a wheel speed sensor, a turn rate sensor, an inclination sensor, an orientation sensor, a motion sensor, a magneto hydro dynamic sensor, a force sensor, an angular sensor, an angular rate sensor, a magnetic field sensor, a magnetometer, an accelerometer; a gyroscope, wherein the inertial measurement unit is adapted to determine by evaluating the data from the detector and the at least one further sensor at least one property of the electronic device selected from the group consisting of: position in space, relative or absolute motion in space, rotation, acceleration, orientation, angle position, inclination, turn rate, speed.

Embodiment 35: A method for determining a position of at least one object by using at least one detector according to any one of the preceding embodiments referring to a detector, the method comprising the following steps:
  determining at least one reflection image of the object by using at least one sensor element having a matrix of optical sensors, the optical sensors each having a light-sensitive area;
  selecting at least one reflection feature of the reflection image at at least one first image position in the reflection image and determining at least one longitudinal coordinate z of the selected reflection feature by optimizing at least one blurring function $f_a$;
  providing at least one reference image, wherein the reference image and the reflection image are determined at two different spatial configurations, wherein the spatial configurations differ by the relative spatial constellation;
  determining at least one reference feature in the reference image at at least one second image position in the reference image corresponding to the longitudinal coordinate z;
  determining the relative spatial constellation from the longitudinal coordinate z and the first and second image positions.

Embodiment 36: The method according to the preceding embodiment, wherein the method comprises monitoring the relative spatial constellation, wherein the relative spatial constellation is determined repeatedly.

Embodiment 37: The method according to any one of the two preceding embodiments, wherein the method comprises at least one temperature determining step, wherein at least one temperature value of the detector is determined.

Embodiment 38: The method according to the preceding embodiment, wherein the relative spatial constellation is determined considering the temperature value and/or the relative spatial constellation is adapted dependent on the temperature value.

Embodiment 39: The method according to any one of the four preceding embodiments, wherein the detector comprises at least one illumination source, wherein the method is used for determining a relative position of the sensor element and the illumination source.

Embodiment 40: The method according to any one of the five preceding embodiments, wherein the detector comprises at least one first sensor element and at least one second sensor element, wherein the first sensor element and the at least one second sensor element are positioned at different spatial configurations, wherein the method comprises selecting at least one image determined by the first sensor element or the second sensor element as reflection image and to select at least one image determined by the other one of the first sensor element or the second sensor element as reference image, wherein the method is used for determining a relative spatial constellation of the first sensor element and the second sensor element.

Embodiment 41: A method for calibrating at least one detector according to any one of the preceding embodiments referring to a detector, the method comprising the following steps:
- determining at least one reflection image of the object by using at least one sensor element having a matrix of optical sensors, the optical sensors each having a light-sensitive area;
- selecting at least one reflection feature of the reflection image at at least one first image position in the reflection image and determining at least one longitudinal coordinate z of the selected reflection feature by optimizing at least one blurring function $f_a$;
- providing at least one reference image, wherein the reference image and the reflection image are determined at two different spatial configurations, wherein the spatial configurations differ by a relative spatial constellation;
- determining at least one reference feature in the reference image at at least one second image position in the reference image corresponding to the longitudinal coordinate z;
- determining the relative spatial constellation from the longitudinal coordinate z and the first and second image positions,
- storing the relative spatial constellation as calibration value in at least one data storage device of at least one evaluation unit.

Embodiment 42: The method according to the preceding embodiment, wherein the method comprises at least one temperature determining step, wherein at least one temperature value of the detector is determined.

Embodiment 43: The method according to the preceding embodiment, wherein the relative spatial constellation and/or the actual relative spatial constellation are determined considering the temperature value and/or the relative spatial constellation and/or the actual relative spatial constellation are adjusted dependent on the temperature value.

Embodiment 44: A use of the detector according to any one of the preceding embodiments relating to a detector, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
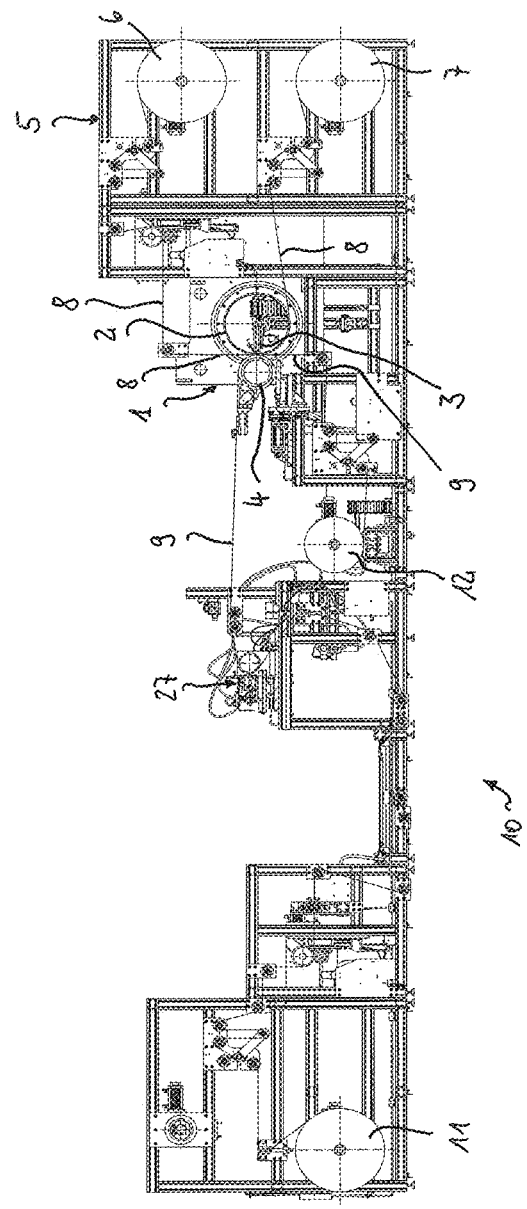
FIG. 1 shows a first embodiment of a detector, detector system, camera, entertainment device and tracking system according to the present invention.

FIG. 1 shows, in a highly schematic illustration, a first embodiment of a detector 110 for determining a position of at least one object 112. The detector 110 specifically may be embodied as a camera 114 and/or may be part of a camera 114. The camera 114 may be made for imaging, specifically for 3D imaging, and may be made for acquiring standstill images and/or image sequences such as digital video clips. Other embodiments are feasible. FIG. 1 further shows an embodiment of a detector system 116, which, besides the at least one detector 110, comprises one or more beacon devices 118, which, in this example, may be attached and/or integrated into an object 112, the position of which shall be detected by using the detector 110. FIG. 1 further shows an exemplary embodiment of a human-machine interface 120, which comprises the at least one detector system 116 and, further, an entertainment device 122, which comprises the human-machine interface 120. FIG. 1 further shows an embodiment of a tracking system 124 for tracking a position of the object 112, which comprises the detector system 116. The components of the devices and systems shall be explained in further detail below.

In this exemplary embodiment, the object 112, the position of which may be detected, may be designed as an article of sports equipment and/or may form a control element or a control device, the position of which may be manipulated by a user 113. As an example, the object 112 may be or may comprise a bat, a racket, a club or any other article of sports equipment and/or fake sports equipment. Other types of objects 112 are possible. Further, the user 113 himself or herself may be considered as the object 112, the position of which shall be detected.

FIG. 1 further shows an exemplary embodiment of a scanning system 126 for scanning a scenery comprising the object 112, such as for scanning the object 112 and/or for determining at least one position of the at least one object 112. The scanning system 126 comprises the at least one detector 110, and, further, optionally, at least one illumination source 128 as well as, optionally, at least one further illumination source, not depicted here. The illumination source 128, generally, is configured to emit at least one illumination light beam, such as for illumination of at least one dot, e.g. a dot located on one or more of the positions of the beacon devices 118 and/or on a surface of the object 112. The scanning system 126 may be designed to generate a profile of the scenery including the object 112 and/or a profile of the object 112, and/or may be designed to generate at least one item of information about the distance between the at least one dot and the scanning system 126, specifically the detector 110, by using the at least one detector 110.

The detector 110 comprises at least one sensor element 130 having a matrix 132 of optical sensors 134. The optical sensors 134 each have a light-sensitive area 136. The sensor element 130 may be formed as a unitary, single device or as a combination of several devices. The matrix 132 specifically may be or may comprise a rectangular matrix having one or more rows and one or more columns. The rows and columns specifically may be arranged in a rectangular fashion. However, other arrangements are feasible, such as triangular, circular, hexagonal, or other nonrectangular arrangements. As an example, circular arrangements are also feasible, wherein the elements are arranged in concentric circles or ellipses about a center point. For example, the matrix 132 may be a single row of pixels. Other arrangements are feasible.

The optical sensors 134 of the matrix 132 specifically may be equal in one or more of size, sensitivity and other optical, electrical and mechanical properties. The light-sensitive areas 136 of all optical sensors 134 of the matrix 132 specifically may be located in a common plane, the common plane preferably facing the object 112, such that a light beam propagating from the object to the detector 110 may generate a light spot on the common plane. The light-sensitive area 136 may specifically be located on a surface of the respective optical sensor 134. Other embodiments, however, are feasible. The optical sensors 134 may comprise for example, at least one CCD and/or CMOS device. As an example, the optical sensors 134 may be part of or constitute a pixelated optical device. As an example, the optical sensors may be part of or constitute at least one CCD and/or CMOS device having a matrix of pixels, each pixel forming a light-sensitive area 136.

The optical sensors 134 specifically may be or may comprise photodetectors, preferably inorganic photodetectors, more preferably inorganic semiconductor photodetectors, most preferably silicon photodetectors. Specifically, the optical sensors 134 may be sensitive in the infrared spectral range. All of the optical sensors 134 of the matrix 132 or at least a group of the optical sensors 134 of the matrix 132 specifically may be identical. Groups of identical optical sensors 134 of the matrix 132 specifically may be provided for different spectral ranges, or all optical sensors may be identical in terms of spectral sensitivity. Further, the optical sensors 134 may be identical in size and/or with regard to their electronic or optoelectronic properties. The matrix 132 may be composed of independent optical sensors 134. Thus, a matrix 132 of inorganic photodiodes may be composed. Alternatively, however, a commercially available matrix may be used, such as one or more of a CCD detector, such as a CCD detector chip, and/or a CMOS detector, such as a CMOS detector chip.

The optical sensors 134 may form a sensor array or may be part of a sensor array, such as the above-mentioned matrix. Thus, as an example, the detector 110 may comprise an array of optical sensors 134, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

The matrix 132 specifically may be a rectangular matrix having at least one row, preferably a plurality of rows, and a plurality of columns. As an example, the rows and columns may be oriented essentially perpendicular. In order to provide a wide range of view, the matrix 132 specifically may have at least 10 rows, preferably at least 50 rows, more preferably at least 100 rows. Similarly, the matrix 132 may have at least 10 columns, preferably at least 50 columns, more preferably at least 100 columns. The matrix 132 may comprise at least 50 optical sensors 134, preferably at least 100 optical sensors 134, more preferably at least 500 optical sensors 134. The matrix 132 may comprise a number of pixels in a multi-mega pixel range. Other embodiments, however, are feasible.

In the embodiment shown in FIG. 1, the detector 110 further comprises an illumination source 138 which in this embodiment is identical with illumination source 128. As an example, the illumination source 138 may be configured for generating an illuminating light beam for illuminating the object 112. The detector 110 may be configured such that the illuminating light beam propagates from the detector 110 towards the object 112 along an optical axis of the detector 110. For this purpose, the detector 110 may comprise at least one reflective element, preferably at least one prism, for deflecting the illuminating light beam onto the optical axis.

The illumination source 138 may be adapted to generate at least one illumination pattern for illumination of the object 112. Specifically, the illumination source 138 may comprise at least one laser and/or laser source. Various types of lasers may be employed, such as semiconductor lasers. Additionally or alternatively, non-laser light sources may be used, such as LEDs and/or light bulbs. The pattern may comprise a plurality of features. The pattern may comprise an arrangement of periodic or non-periodic features. The illumination pattern may comprise at least one pattern selected from the group consisting of: at least one point pattern, in particular a pseudo-random point pattern; at least one pattern comprising at least one pre-known feature. For example, the illumination source 138 may be adapted to generate and/or to project a cloud of points. The illumination source 138 may comprise one or more of at least one light projector; at least one digital light processing (DLP) projector, at least one LCoS projector, at least one spatial light modulator; at least one diffractive optical element; at least one array of light emitting diodes; at least one array of laser light sources. The illumination source 138 may comprise at least one light source adapted to generate the illumination pattern directly. The illumination source 138 may comprise the at least one light projector adapted to generate a cloud of points such that the illumination pattern may comprise a plurality of point pattern. The illumination source 138 may comprise at least one mask adapted to generate the illumination pattern from at least one light beam generated by the illumination source 138. The illumination source 138 may illuminate the at least one object 112 with the illumination pattern. The illumination pattern may comprise a plurality of points as image features. These points are illustrated as light beams 140 emerging from the illumination source 138.

Each optical sensor 134 may be designed to generate at least one sensor signal in response to an illumination of its respective light-sensitive area 136 by a light beam 141 propagating from the object 112 to the detector 110.

Furthermore, the sensor element 130 is adapted to determine at least one reflection image 142. The matrix 132 may comprise the reflection image 142. The reflection image 142 may comprise points as reflection features. These points result from light beams 141 originating from the at least one object 112.

The detector 110 may comprise at least one transfer device 144 comprising one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. In particular, the transfer device 144 may comprise at least one collimating lens adapted to focus at least one object point in an image plane.

The detector 110 comprises at least one evaluation device 146.

As outlined above, the determination of the position of the object 112 and/or a part thereof by using the detector 110 may be used for providing the human-machine interface 120, in order to provide at least one item of information to a machine, not shown here. The machine may be a computer and/or may comprise a computer. Other embodiments are feasible. The evaluation device 146 may even be fully or partially integrated into the machine, such as into the computer.

The tracking system 124 comprises the detector 110 and at least one track controller 147. The track controller 147 may be adapted to track a series of positions of the object 112 at specific points in time. The track controller 147 may be an independent device and/or may be fully or partially integrated into the machine, specifically the computer, and/or, as in FIG. 1, into the evaluation device 146.

Similarly, as outlined above, the human-machine interface 120 may form part of an entertainment device 122. The machine, specifically the computer, may also form part of the entertainment device 122. Thus, by means of the user 113 functioning as the object 112 and/or by means of the user 113 handling a control device functioning as the object 112, the user 113 may input at least one item of information, such as at least one control command, into the computer, thereby varying the entertainment functions, such as controlling the course of a computer.

The evaluation device 146 is adapted to select at least one reflection feature of the reflection image 142 at at least one first image position 148. The evaluation device 146 may be adapted to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a blob analysis; applying an edge filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors 134.

The evaluation device 146 is configured for determining at least one longitudinal coordinate z of the selected reflection feature by optimizing at least one blurring function $f_a$. Specifically, the evaluation device 146 may be configured for determining at least one distance estimate. The distance estimate may be at least one uncertainty interval defined by the longitudinal coordinate z and a measurement uncertainty ±ε of the determination of the longitudinal coordinate. The error interval ε may depend on the measurement uncertainty of the optical sensor and/or further parameters such as temperature, motion, or the like. The measurement uncertainty of the optical sensors 134 may be pre-determined and/or estimated and/or may be deposited in at least one data storage unit of the evaluation device 146. For example, the error interval may be ±10%, preferably ±5%, more preferably ±1%. The determining of the distance estimate may yield a distance estimate with an error bar that is generally larger than that of triangulation methods. The longitudinal coordinate z may be determined by using at least one convolution-based algorithm such as a depth-from-defocus algorithm. To obtain the distance from the reflection feature, the depth-from-defocus algorithm estimates the defocus of the object. For this estimation, the blurring function is assumed. Specifically, the blurring function models the blur of a defocused object. The at least one blurring function $f_a$ may be a function or composite function composed from at least one function from the group consisting of: a Gaussian, a sinc function, a pillbox function, a square function, a Lorentzian function, a radial function, a polynomial, a Hermite polynomial, a Zernike polynomial, a Legendre polynomial.

The sensor element 130 may be adapted to determine the at least one reflection pattern. The evaluation device 146 may be adapted to select the at least one feature of the reflection pattern and to determine the longitudinal coordinate z of the selected feature of the reflection pattern by optimizing the at least one blurring function $f_a$.

The blurring function may be optimized by varying the parameters of the at least one blurring function. The reflection image 142 may be a blurred image $i_b$. The evaluation device 146 may be configured to reconstruct the longitudinal coordinate z from the blurred image $i_b$ and the blurring function $f_a$. The longitudinal coordinate z may be determined by minimizing a difference between the blurred image $i_b$ and the convolution (*) of the blurring function $f_a$ with at least one further image $i'_b$, $$\min \|(i'_b * f_a(\sigma(z)) - i_b)\|,$$

by varying the parameters σ of the blurring function. σ(z) is a set of distance dependent blurring parameters. The further image may be blurred or sharp. The at least one further image may be generated from the blurred image $i_b$ by a convolution with a known blurring function. Thus, the depth-from-defocus algorithm may be used to obtain a distance estimate of the reflection feature. This distance estimate may be used to efficiently choose a region within which an epipolar line is selected, which will be outlined in more detail below. The distance may then be calculated using triangulation and the selected epipolar line. The determining of the distance estimate can be applied to a single feature of the reflection image, as opposed to most triangulation methods. Thus, the determining of the distance estimate may be used to speed-up the triangulation method by yielding a smaller region in which the correspondence problem is solved.

The sensor element 130 may be adapted to determine at least one reflection pattern. The reflection pattern may comprise at least one feature corresponding to at least one feature of the illumination pattern. The reflection pattern may comprise, in comparison to the illumination pattern, at least one distorted pattern, wherein the distortion depends on the distance of the object, such as surface properties of the object. The evaluation device 146 may be adapted to select at least one feature of the reflection pattern and to determine the longitudinal coordinate z of the selected feature of the reflection pattern, as described above.

The evaluation device 146 is adapted to determine at least one reference feature in at least one reference image at at least one second image position in the reference image corresponding to the at least one reflection feature. The reference image and the reflection image are determined at two different spatial configurations. The spatial configurations differ by a relative spatial constellation. In the embodiment shown in FIG. 1, the reference image may be an image of the illumination pattern at an image plane at a position of the illumination source 128. The evaluation device 146 may be adapted to perform an image analysis and to identify features of the reference image. The evaluation device 146 may be adapted to identify at least one reference feature in the reference image having an essentially identical longitudinal coordinate as the selected reflection feature. The reference feature corresponding to the reflection feature may be determined using epipolar geometry. Epipolar geometry may assume that the reference image and the reflection image may be images of the object 112 determined at different spatial positions and/or spatial orientations having, for example during recording of reference image and reflection image, a fixed distance. The distance may be a relative distance, also denoted as baseline. The evaluation device 146 may be adapted to determine an epipolar line in the reference image. The relative position of the reference image and the reflection image may be known. For example, the relative position of the reference image and the reflection image may be stored within at least one storage unit of the evaluation device. The evaluation device 146 may be adapted to determine a straight line extending from the selected reflection feature of the reflection image to the real world feature from which it originates. Thus, the straight line may comprise possible object features corresponding to the selected reflection feature. The straight line and the baseline span an epipolar plane. As the reference image is determined at a different relative spatial constellation from the reflection image, the corresponding possible object features may be imaged on a straight line, called epipolar line, in the reference image. The epipolar line may be the intersection of the epipolar plane and the reference image. Thus, a feature of the reference image corresponding to the selected feature of the reflection image lies on the epipolar line.

Depending on the distance to the object 112 the reference feature corresponding to the second image position of the reflection feature is displaced within the reference image compared to the first image position. The reference image may comprise at least one displacement region in which the reference feature corresponding to the selected reflection feature may be imaged. The displacement region may comprise only one reference feature. The evaluation device 146 may be configured to determine at least one longitudinal region, wherein the longitudinal region is given by the longitudinal coordinate z and an error interval ±ε. The evaluation device may be configured to determine the at least one displacement region in the reference image corresponding to the longitudinal region. The displacement region may extend along the epipolar line. The evaluation device 146 may be adapted to determine the reference feature along the epipolar line. The evaluation device may be adapted to determine the longitudinal coordinate z for the reflection feature and the error interval ±ε to determine the displacement region along the epipolar line corresponding to z±ε. The evaluation device 146 may be adapted to match the selected reflection feature with at least one reference feature within the displacement region. The evaluation device 146 may be adapted to match the selected feature of the reflection image with the reference feature within the displacement region by using at least one evaluation algorithm considering the determined longitudinal coordinate z. The evaluation algorithm may be a linear scaling algorithm.

The evaluation device 146 may be adapted to determine a displacement of the reference feature and the reflection feature. The evaluation device 146 may be adapted to determine the displacement of the matched reference feature and the selected reflection feature. The evaluation device 146 may be adapted to determine a longitudinal information of the matched feature using a predetermined relationship between a longitudinal coordinate and the displacement. For example, the longitudinal information may be a distance value. The evaluation device 146 may be adapted to determine the pre-determined relationship by using triangulation methods. In case the position of the selected reflection feature in the reflection image and the position of the matched reference feature and/or relative displacement of the selected reflection feature and the matched reference feature are known, the longitudinal coordinate of the corresponding object feature may be determined by triangulation. Thus, the evaluation device 146 may be adapted to select, for example subsequent and/or column by column, a reflection feature and to determine for each potential position of the reference feature the corresponding distance value using triangulation. Displacement and corresponding distance value may be stored in at least one storage device of the evaluation device 146. The evaluation device 146 may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage device may be provided, such as for providing one or more look-up tables for storing the predetermined relationship.

The evaluation device 146 may be adapted to determine the relative spatial constellation from the longitudinal coordinate z and the first and second image positions. As outlined above, the epipolar geometry may require good knowledge of the relative spatial constellation, in particular the baseline, of the reflection image and reference image. However, the relative spatial constellation of the detector components such as the illumination source 138 and the sensor element 130 may be unknown and/or may change during measurement time, for example due to thermal influences. The longitudinal coordinate z determined by using at least one depth-from-defocus algorithm can be used to calibrate and/or to recalibrate triangulation systems. As outlined above, the evaluation device 146 may be adapted to determine the displacement of the reference feature and the reflection feature. The evaluation device 146 may be adapted to determine at least one triangulation longitudinal coordinate $z_{triang}$ of the object 112 using a pre-defined relationship between the triangulation longitudinal coordinate $z_{triang}$ of the object 112 and the displacement. The triangulation longitudinal coordinate $z_{triang}$ may be determined from first and second image positions using epipolar geometry assuming a fixed relative spatial constellation and with a pre-defined and/or pre-determined value of the relative spatial constellation. In particular, the pre-defined relationship may depend on the relative spatial constellation. The evaluation device may be adapted to store the pre-defined relationship. The evaluation device 146 may be adapted to compare the longitudinal coordinate z and the triangulation longitudinal coordinate $z_{triang}$. The evaluation device 146 may be adapted to determine an actual relationship between the longitudinal coordinate z and the displacement considering the determined relative spatial constellation. The evaluation device 146 may be adapted to adjust the pre-defined relationship depending on the actual relationship. The evaluation device 146 may be adapted to replace the pre-defined relationship, in particular the stored pre-defined relationship, by the actual relationship and/or the evaluation may be adapted to determine a moving average and to replace the pre-defined relationship by the moving average. The evaluation device 146 may be adapted to determine a difference between the longitudinal coordinate z and the triangulation longitudinal coordinate $z_{triang}$. The evaluation device 146 may be adapted to compare the determined difference to at least one threshold and to adjust the pre-defined relationship in case the determined difference is above or equal to the threshold. The evaluation device 146 may be adapted to determine from the actual relationship and the longitudinal coordinate z the relative spatial constellation. For example, the illumination source 138 and sensor element 130 may be separated by the baseline b, d being the displacement on the sensor, f being a focal length of a transfer device of the detector and β being an angle between the illumination source and the baseline. Typical values for baseline and displacement are discussed by Kurt Konolige et al., A Low-Cost Laser Distance Sensor, 2008 IEEE International Conference on Robotics and Automation, Pasadena, CA, USA, May 19-23, 2008. For β=90° is $$z_{triang} = f \cdot \frac{b}{d}, \text{ and}$$

$$b = z_{triang} \cdot \frac{d}{f}.$$

Thus, in case the distance to the object, i.e. the longitudinal coordinate z, $z_{triang}$ can be replaced by z and a corrected baseline $b_{cor}$ can be calculated by $$b_{cor} = z \cdot \frac{d}{f}.$$

For β smaller than 90° is $$z_{triang} = \left(f \cdot \frac{b}{d}\right) \cdot \frac{1}{1 + \cot(\beta)\left(\frac{f}{d}\right)}.$$

Thus, the corrected baseline $b_{cor}$ can be calculated by $$b_{cor} = \left(d \cdot \frac{z}{f}\right) \cdot \left(1 + \cot(\beta)\left(\frac{f}{d}\right)\right)$$

and the angle β can be determined from $$\cot(\beta) = \left(\frac{b_{cor}}{z} - \frac{d}{f}\right).$$

Since β and b may change simultaneously, both values may be determined using subsequent measurements. Thus, the measurement of the longitudinal coordinate z for a feature point, for which in addition the triangulation longitudinal coordinate $z_{triang}$, i.e. the distance from the sensor element to the object determined by triangulation, is known, can be used to correct the predefined relationship. The evaluation device 146 may be adapted to determine and/or to correct and/or to calibrate a value of the relative spatial constellation, such as of the baseline value, by using the longitudinal coordinate z and the triangulation longitudinal coordinate $z_{triang}$. The various sensor signals may be used within a mathematical model, whereas the mathematical model may be selected from a Kalman filter, a linear quadratic estimate, a Kalman-Bucy-Filter, a Stratonovich-Kalman-Bucy-Filter, a Kalman-Bucy-Stratonovich-Filter, a minimum variance estimator, a Bayesian estimator, a Best linear unbiased estimator, an invariant estimator, a Wiener filter, or the like to take into account that each sensor signal is subject to measurement errors and inaccuracies, whereas the fusion of these sensor signals within a mathematical model such as a Kalman filter may yield an improved estimate such as for the relative spatial constellation and/or the measurement of the longitudinal coordinate.

The longitudinal coordinate z and the triangulation longitudinal coordinate $z_{triang}$ may be determined for a plurality of feature points, in particular to get a statistically confirmed value of the calibrated relationship and/or calibrated relative spatial constellation. Since the relative spatial constellation will not change suddenly such a statistical evaluation may be well suited.

Figure 2:
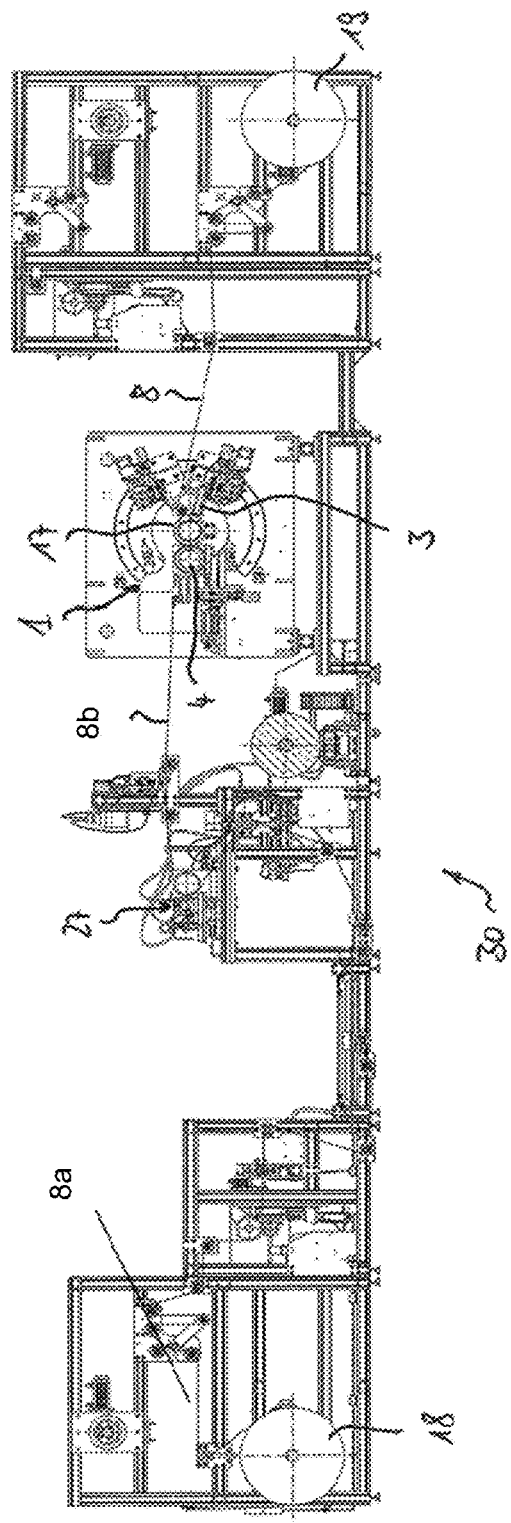
FIG. 2 shows a second embodiment of a detector, detector system, camera, entertainment device and tracking system according to the present invention.

FIG. 2 shows a second embodiment of the detector 110, detector system 116, camera 114, entertainment device 122 and tracking system 124. With respect of detector 110, detector system 116, camera 114, entertainment device 122 and tracking system 124 reference is made to the description of FIG. 1. In addition to FIG. 1, in this embodiment, the detector 110 may comprise two sensor elements 130, a first sensor element 150 and a second sensor element 152. The first sensor element 150 and the second sensor element 152 may be connected by a mechanical connector 156. The mechanical connector 156 may be adjustable and/or non-permanent. Some points on the object 112 may be illuminated by the optional illumination source 138 and may be detected by both sensor elements 150 and 152. The evaluation device 146 may be configured for determining the longitudinal coordinate z of the object 112 by optimizing the blurring function $f_a$. The first sensor element 150 and the second sensor element 152 may be adapted to image object features, in particular of the points illuminated by the optional illumination source 138. An image of the first sensor element 150 or the second sensor element 152 may be selected as the reflection image, wherein the other, corresponding, image of the other sensor element may be selected as reference image. The evaluation device 146 may be adapted to determine the at least one reflection feature at the at least one first image position 148 and to determine at the at least second image position 154 the reference feature corresponding to the reflection feature, as described with respect to FIG. 1. The evaluation device 146 may be adapted to determine the relative spatial constellation, in particular the baseline, from the longitudinal coordinate z and the first and second image positions, as described with respect to FIG. 1.

The determination of the longitudinal coordinate z may be performed for a single reflection feature or for a plurality or all reflected object features in the images determined by the first sensor element 150 and/or the second sensor element 152. Feature points which are not illuminated by the optional illumination source 138 may be used to calculate additional longitudinal coordinates z and/or may be used to calculate a pose estimation.

Figure 3A:
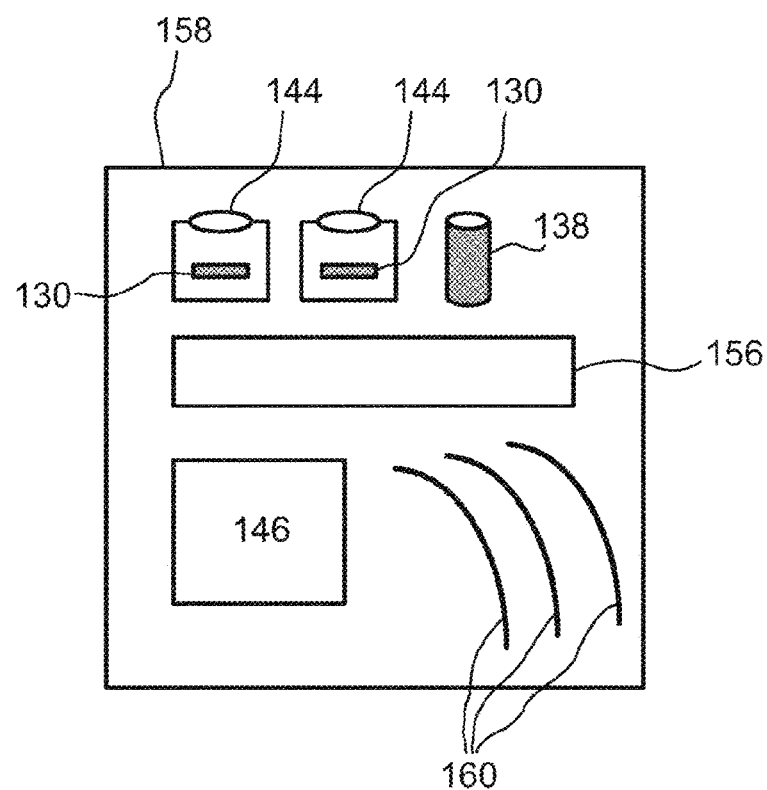
FIGS. 3A and 3B show an embodiment of a product concept.
Figure 3B:
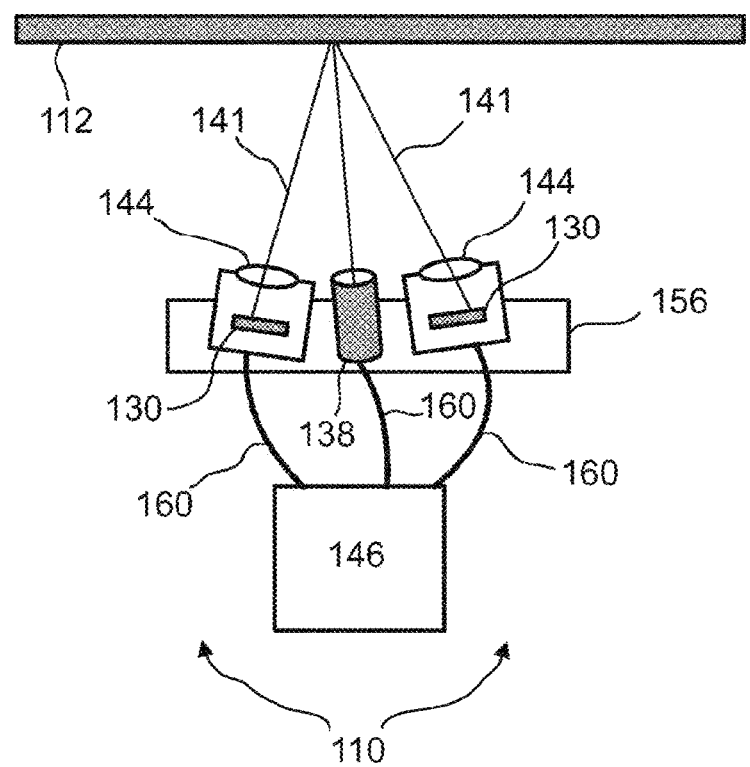

FIGS. 3A and 3B show an embodiment of a product concept. FIG. 3A shows product packaging 158 comprising components of the detector 110, in particular, sensor elements 130, transfer devices 144, illumination source 138, mechanical connector 156, evaluation device 146 and a plurality of cables 160 for connecting the individual components. At least one transfer device 144 and at least one sensor element 130 may be pre-assembled in the product packaging 158. The other detector components within the product packaging 158 may be stored as individual, not assembled components. A user may remove the components from the packaging, may connect the components via mechanical connector 156 and cables 160. The evaluation device 146 may be adapted to set up the detector 110. The assembled detector 110 is shown in FIG. 3B and corresponds to the detector setup described in FIG. 2. The evaluation device 146 may be adapted to determine the longitudinal coordinate z of the at least one reflection feature in the reflection image determined by one or both sensor elements 130 by using at least one depth-from-defocus algorithm, as outlined with respect to FIG. 2. The evaluation device 146 may be adapted to determine the relative spatial constellation of the illumination source 138 and the respective sensor element 130 using the longitudinal coordinate z, as outlined above.

Figure 4:
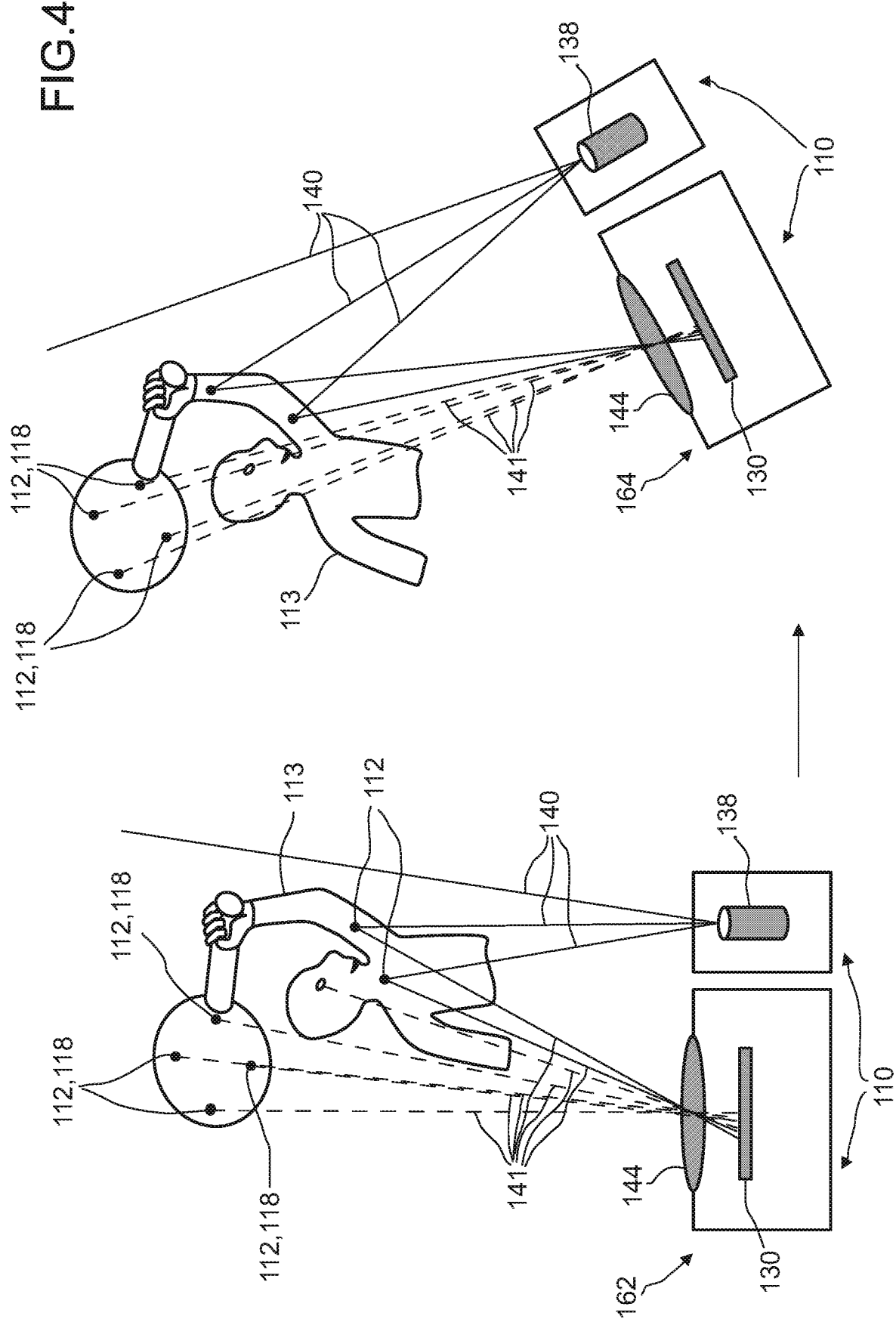
FIG. 4 shows a further embodiment of the detector according to the present invention.

FIG. 4 shows a further embodiment of the detector 110, in particular for use in a mobile system using structure from motion 3D sensing methods. The evaluation device may be adapted to set up the mobile system having with a flexible relative constellation, in particular a flexible baseline. In contrast to the mechanical connection of the sensor element 130 and the optional illumination source 138 as shown in FIG. 1, the sensor element 130 and the optional illumination source 138 of the detector 110 as shown in FIG. 4 may not be mechanically connected. Position and/or orientation of the optional illumination source 138 may change with respect to the sensor element 130. The detector 110 may be adapted to determine a first image at a first spatial configuration 162. The optional illumination source 138 may be adapted to illuminate some points which can be detected as reflection features in the first image. The evaluation device 146 may be adapted to determine the longitudinal coordinate z for these points. Further, additional features, in particular points not illuminated by illumination source 138, may be detected and/or imaged by the sensor element. Alternatively, embodiments are feasible, wherein the detector may not comprise the optional illumination source 138. The feature point may be designed such that the reflection image can be generated passively from it. For example, the feature point may be a white circle.

The detector 110 may be adapted to record the reflection image and the reference image using the same matrix 132 of optical sensors 134. In particular, as shown in FIG. 4, the sensor element 130 may move or is moved with, for example with a constant or variable velocity, from the first spatial configuration 162 to at least one second spatial configuration 164. The illumination source 138 may be adapted to illuminate in the second spatial configuration 164 some points which can be detected as reflection features in a second image. The evaluation device 146 may be adapted to determine the longitudinal coordinate z for these points. Further, additional features, in particular points not illuminated by illumination source 138, may be detected and/or imaged by the sensor element 130.

The detector 110 may be adapted to determine a plurality of images, in particular subsequently, wherein one of the images may be selected as reflection image and another one may be selected as reference image. The evaluation device 146 may be adapted to perform a 3D sensing method such as structure from motion or pose estimation, for example as described in Ramalingam et al. "Pose Estimation using Both Points and Lines for Geo-Localization", published in Robotics and Automation (ICRA), 2011 IEEE International Conference on Robotics and Automation, Publisher: IEEE ISBN: 978-1-61284-385-8. The term "structure from motion" will be used as synonym for both structure from motion and shape from motion. The evaluation device 146 may be adapted to estimate the poses of the sensor elements 130 using the, non-illuminated, feature points and to estimate a relative spatial constellation up to a scaling factor. The scaling factor may be obtained from the feature points for which a longitudinal coordinate z was calculated.

The lack of a fixed relative spatial constellation of the reference image and the reflection image such as a baseline may result in a so-called scale drift and loss in accuracy of the distance determination or may not allow an absolute distance measurement without additional information. In particular, structure from motion and pose estimation algorithms may determine longitudinal and transversal information such as the size, dimension, distance, and/or orientation of an object only up to a scaling factor, whereas the scaling factor scales an internal arbitrary distance unit of the evaluation device 146 to an absolute real world distance scale. In particular, structure from motion and pose estimation algorithms require additional information for image reconstruction in order to scale the image information to an absolute distance scale. The evaluation device 146 may be adapted to determine at least one scaling factor for the relative spatial constellation. For example, in a structured light system consisting of the at least one image sensor and the at least one illumination source, the baseline is lengthened due to a temperature increase of the system, resulting in an increased distance between the at least one image sensor and the at least one illumination source, while the focal length of the lens and the distance of the lens to the sensor are kept fixed. Within this example, when comparing two objects with identical position in the reflection image, whereas a first object is measured in a first measurement with the original baseline, whereas a second object is measured in a second measurement with the lengthened baseline, the object measured with the lengthened baseline is farer away than the object measured with the original baseline. The angles between the baseline and the straight line connecting the feature point in the reflection image with the corresponding feature point on the object itself, are identical for both objects, so that the two measurements may be compared using the principle of similar triangles. The distance of the object is measured along the straight line. In this example, according to the principle of similar triangles, the quotient of the distance of the object to the lens and the baseline is identical for the measurement with the original baseline and for the measurement with the lengthened baseline. Thus, the scaling factor that scales the original baseline to the lengthened baseline is the same that scales the original object distance to the increased object distance. Thus, according to the principle of similar triangles, the scaling factor of the baseline also scales the distance, specifically the longitudinal coordinate z. The evaluation device 146 may be adapted to perform an absolute measurement of longitudinal coordinate z by optimizing the blurring function $f_a$. The evaluation device 146 may be adapted to determine the scaling factor from the longitudinal coordinate z. The determination of the scaling factor may be further refined by using sensor data from an inertial measurement unit.

The evaluation device 146 may be adapted to determine the longitudinal coordinate z for at least one feature point of at least one image recorded by the sensor element 130, for example in the first spatial configuration 162, from the respective combined sensor signal and to determine the scaling factor therefrom. The scaling factor can be maintained for the remaining measurement and/or as long as at least one feature point can be tracked from one image to another and/or can be recalculated during the measurement. For example, the scaling factor can be determined in every image recorded by the sensor element 130. This may ensure a statistically verified and consistent measurement of the scaling factor.

The scaling factor may be determined from a single measurement point of the image and/or the scaling factor may be determined from a plurality of measurements. In particular, the evaluation device may be adapted to determine medium scaling factor.

For example, the detector in the embodiment shown in FIG. 4 may be used in a mobile phone or smartphone. The optical sensor 134 may be an integrated CMOS usually used for photos or videos. The illumination source 138 may be either an integrated laser used for auto-focus or an additional illumination source attached and connected via headphone jack or the like. Additional means for attachment may be used. The distance between the illumination source 138 and the optical sensor 134 may be dependent on the mobile phone type or smartphone type and may be determined by the means of the present invention. For example, the relative spatial constellation may be determined using the longitudinal coordinate z and structure from motion may be used for further distance determination.

Figure 5:
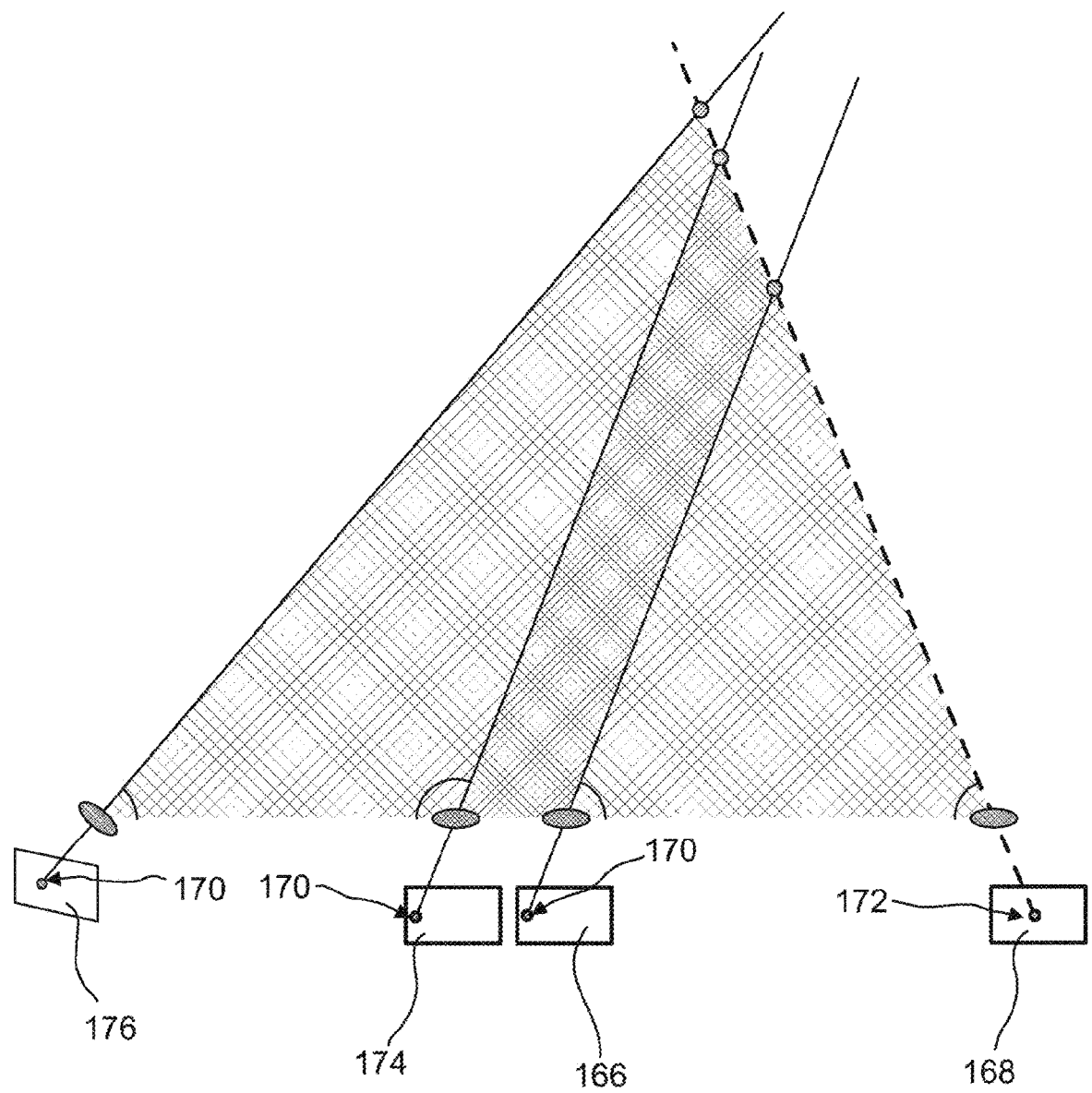
FIG. 5 shows three situations for obtaining a relative spatial constellation.

FIG. 5 shows three situations of obtaining the relative spatial constellation. Assigning one image as the reflection image and one image as the reference image is entirely exchangeable and is only assigned to facilitate the discussion but shall not limit its generality.

In a first situation shown in FIG. 5, a first reflection image 166 and a reference image 168 are determined. The relative spatial constellation may be known such as from a factory calibration. The distance of the object 112 may be obtained from determining the image position of the corresponding feature points 170 and 172, determining the displacement of the feature points and using a predetermined relationship to obtain the distance of the object via a triangulation calculation. This distance determination may be performed or used in structured light and stereo systems.

In a second situation shown in FIG. 5 compared to the first situation, the baseline b has been lengthened for example due to temperature effects. The feature point 170 that is at the same image position in the first reflection image 166 and in a second reflection image 174 corresponds to an increased object distance in the lengthened baseline situation. The corresponding feature point 172 in the reference images 168 is the same compared to the first situation, since the focal lengths are unchanged. Since the length of the baseline is increased and the corresponding feature points do not change, all angles in the first and second situations are identical. Since all angles are identical, the principle of similar triangles yields, that the quotient of the two baselines equals the quotient of the two distances. The correct distances in the second situation, can be determined by using the at least one longitudinal coordinate z determined by optimizing the blurring function $f_a$ and the triangulation longitudinal coordinate $z_{triang}$. The quotient $z/z_{triang}$ may give the scaling factor to scale the distances determined by triangulation from the first situation to the second situation. This determination of the relative spatial constellation may be generally applicable in structured light and stereo systems. Pose estimation algorithms applied to at least one of the reference image 168, the first reflection image 166 or the second reflection image 174 may allow estimating, whether only the baseline or further parameters such as orientation angles have changed in the two situations.

Furthermore in FIG. 5, a third situation is shown with an altered baseline and an altered orientation. In particular, a third reflection image 176 may be determined. Compared to the first situation, the baseline and the orientation angles have been altered. Pose estimation or structure from motion algorithms may yield the fact that the orientation angles have been altered using at least six feature points. Further, pose estimation or structure from motion algorithms may be able to determine the relative distances and orientation angles between the feature points and the detector. However, since the baseline length is not known, after determining the relative distances and angles, the problem to determine an absolute distance is comparable to the second situation. Therefore, after determining the relative distances and orientation angles, a single, distance measurement of the longitudinal coordinate z for one feature point will be sufficient to determine the scaling factor to scale the relative distances to an absolute value. As an example, the original baseline length or an approximated baseline length may be used to calculate a triangulation distance using the new orientation angles. The scaling factor is then given by $z/z_{triang}$, similar to the second situation. This determination of the relative spatial constellation may be applicable in stereo, structured light and structure from motion systems.

LIST OF REFERENCE NUMBERS 110 detector
112 object
113 user
114 camera
116 detector system
118 beacon device
120 human-machine interface
122 entertainment device
124 tracking system
126 scanning system
128 illumination source
130 sensor element
132 matrix
134 optical sensor
136 light-sensitive area
138 illumination source
140 light beam
141 light beam
142 reflection image
144 transfer device
146 evaluation device
147 track controller
148 first image position
150 first sensor element
152 second sensor element
154 second image position
156 mechanical connector
158 product packaging
160 cable
162 first spatial configuration
164 second spatial configuration
166 first reflection image
168 reference image
170 feature point
172 feature point
174 second reflection image
176 third reflection image

The invention claimed is:

1. A detector (110) for determining a position of at least one object (112), the detector (110) comprising:
   at least one sensor element (130) having a matrix (132) of optical sensors (134), the optical sensors (134) each having a light-sensitive area (136), wherein the sensor element (130) is configured to determine at least one reflection image (142); and
   at least one evaluation device (146), wherein the evaluation device (146) is configured to select at least one reflection feature of the reflection image (142) at at least one first image position (148) in the reflection image (142), wherein the evaluation device (146) is configured for determining at least one longitudinal coordinate z of the selected reflection feature by optimizing at least one blurring function $f_a$, wherein the evaluation device (146) is configured to determine at least one reference feature in at least one reference image (168) at at least one second image position (154) in the reference image (168) corresponding to the at least one reflection feature, wherein the reference image (168) and the reflection image (142) are determined at two different spatial configurations, wherein the spatial configurations differ by a relative spatial constellation, wherein the evaluation device (146) is configured to determine the relative spatial constellation from the longitudinal coordinate z and the first image position (148) and the second image position (154).

2. The detector (110) according to claim 1, wherein the longitudinal coordinate z is determined by using at least one convolution-based algorithm such as a depth from defocus algorithm.

3. The detector (110) according to claim 1, wherein the blurring function is optimized by varying the parameters of the at least one blurring function.

4. The detector (110) according to claim 3, wherein the reflection image (142) is a blurred image $i_b$, wherein evaluation device (146) is configured to reconstruct the longitudinal coordinate z from the blurred image $i_b$ and the blurring function $f_a$.

5. The detector (110) according to claim 4, wherein the longitudinal coordinate z is determined by minimizing a difference between the blurred image $i_b$ and the convolution of the blurring function $f_a$ with a further image $i'_b$, $$\min\|(i'_b * f_a(\sigma(z)) - i_b)\|,$$

by varying the parameters σ of the blurring function.

6. The detector (110) according to claim 1, wherein the at least one blurring function $f_a$ is a function, or a composite function composed from at least one function from the group consisting of: a Gaussian, a sinc function, a pillbox function, a square function, a Lorentzian function, a radial function, a polynomial, a Hermite polynomial, a Zernike polynomial, and a Legendre polynomial.

7. The detector (110) according to claim 1, wherein the relative spatial constellation is at least one constellation selected from the group consisting of: a relative spatial orientation; a relative angle position; a relative distance; a relative displacement; and relative movement.

8. The detector (110) according to claim 1, wherein the detector (110) comprises at least two sensor elements (130) separated by a relative spatial constellation, wherein at least one first sensor element (150) is adapted to record the reference image (168) and at least one second sensor element (152) is adapted to record the reflection image (142).

9. The detector (110) according to claim 1, wherein the detector (110) is configured to record the reflection image (142) and the reference image (168) using the same matrix (132) of optical sensors (134) at different times.

10. The detector (110) according to claim 9, wherein the evaluation device (146) is configured to determine at least one scaling factor for the relative spatial constellation.

11. The detector (110) according to claim 1, wherein the evaluation device (146) is configured to determine a displacement of the reference feature and the reflection feature, wherein the evaluation device (146) is configured to determine at least one triangulation longitudinal coordinate $z_{triang}$ of the object using a pre-defined relationship between the triangulation longitudinal coordinate $z_{triang}$ of the object and the displacement, wherein the evaluation device (146) is configured to determine an actual relationship between the longitudinal coordinate z and the displacement considering the determined relative spatial constellation, wherein the evaluation device (146) is configured to adjust the pre-defined relationship depending on the actual relationship.

12. The detector (110) according to claim 11, wherein the evaluation device (146) is configured to replace the predefined relationship by the actual relationship and/or the evaluation is configured to determine a moving average and to replace the pre-defined relationship by the moving average.

13. The detector (110) according to claim 11, wherein the evaluation device (146) is configured to determine a difference between the longitudinal coordinate z and the triangulation coordinate $z_{triang}$, wherein the evaluation device (146) is configured to compare the determined difference to at least one threshold and to adjust the pre-defined relationship in case the determined difference is above or equal to the threshold.

14. The detector (110) according to claim 11, wherein the evaluation device (146) is configured to determine an estimate of a corrected relative spatial relationship using a mathematical model including parameters including various sensor signals and/or positions and/or the image positions and/or the system properties and/or longitudinal coordinates, a displacement on the sensor d, a focal length of a transfer device f, temperature, $z_{triang}$, the baseline b, an angle between the illumination source and the baseline (3, or the longitudinal coordinate z, wherein the mathematical model is at least one mathematical model selected from the group consisting of: a Kalman filter, a linear quadratic estimate, a Kalman-Bucy-Filter, a Stratonovich-Kalman-Bucy-Filter, a Kalman-Bucy-Stratonovich-Filter, a minimum variance estimator, a Bayesian estimator, a Best linear unbiased estimator, an invariant estimator, and a Wiener filter.

15. The detector (110) according to claim 1, wherein the evaluation device (146) is configured to determine at least one longitudinal region, wherein the longitudinal region is given by the longitudinal coordinate z and an error interval ±c, wherein the evaluation device is configured to determine at least one displacement region in the reference image (168) corresponding to the longitudinal region, wherein the evaluation device (146) is configured to determine an epipolar line in the reference image (168), wherein the displacement region extends along the epipolar line, wherein the evaluation device (146) is configured to determine the reference feature along the epipolar line corresponding to the longitudinal coordinate z and to determine an extent of the displacement region along the epipolar line corresponding to the error interval ±ε.

16. The detector (110) according to claim 15, wherein the evaluation device (146) is configured to perform the following steps:
Determining a displacement region for the second image position (154) of each reflection feature;
Assigning an epipolar line to the displacement region of each reflection feature such as by assigning the epipolar line closest to a displacement region and/or within a displacement region and/or closest to a displacement region along a direction orthogonal to the epipolar line; and
Assigning and/or determining at least one reference feature to each reflection feature by assigning the reference feature closest to the assigned displacement region and/or within the assigned displacement region and/or closest to the assigned displacement region along the assigned epipolar line and/or within the assigned displacement region along the assigned epipolar line.

17. The detector (110) according to 15, wherein the evaluation device (146) is configured to match the reflection feature with the at least one reference feature within the displacement region.

18. A detector system (116) for determining a position of at least one object (112), the detector system (116) comprising at least one detector (110) according to claim 1, the detector system (116) further comprising at least one beacon device (118) adapted to direct at least one light beam towards the detector (110), wherein the beacon device (118) is at least one of attachable to the object (112), holdable by the object (112), and integratable into the object (112).

19. A human-machine interface (120) for exchanging at least one item of information between a user (113) and a machine, wherein the human-machine interface (120) comprises at least one detector system (116) according to claim 18, wherein the at least one beacon device (118) is adapted to be at least one of directly or indirectly attached to the user (113) and held by the user (113), wherein the human-machine interface (120) is designed to determine at least one position of the user (113) by means of the detector system (116), wherein the human-machine interface (120) is designed to assign to the position at least one item of information.

20. An entertainment device (122) for carrying out at least one entertainment function, wherein the entertainment device comprises at least one human-machine interface (120) according to claim 19, wherein the entertainment device (122) is designed to enable at least one item of information to be input by a player by means of the human-machine interface (120), wherein the entertainment device (122) is designed to vary the entertainment function in accordance with the information.

21. A tracking system (124) for tracking a position of at least one movable object, the tracking system (124) comprising at least one detector system (116) according to claim 18, the tracking system (124) further comprising at least one track controller, wherein the track controller is adapted to track a series of positions of the object at specific points in time.

22. A scanning system (126) for determining a depth profile of a scenery, the scanning system (126) comprising at least one detector (110) according to claim 1, the scanning system (126) further comprising at least one illumination source (128) adapted to scan the scenery with at least one light beam.

23. A camera (114) for imaging at least one object (112), the camera (114) comprising at least one detector (110) according to claim 1.

24. An inertial measurement unit for use in an electronic device, wherein the inertial measurement unit is adapted to receive data determined by at least one detector (110) according to claim 1, wherein the inertial measurement unit further is adapted to receive data determined by at least one further sensor selected from the group consisting of: a wheel speed sensor, a turn rate sensor, an inclination sensor, an orientation sensor, a motion sensor, a magneto hydro dynamic sensor, a force sensor, an angular sensor, an angular rate sensor, a magnetic field sensor, a magnetometer, an accelerometer; and a gyroscope, wherein the inertial measurement unit is adapted to determine by evaluating the data from the detector and the at least one further sensor at least one property of the electronic device selected from the group consisting of: position in space, relative or absolute motion in space, rotation, acceleration, orientation, angle position, inclination, turn rate, and speed.

25. A method for determining a position of at least one object (112) by using at least one detector (110) according to claim 1, the method comprising the following steps:
determining at least one reflection image (142) of the object (112) by using at least one sensor element (130)

having a matrix (132) of optical sensors (134), the optical sensors (134) each having a light-sensitive area (136);

selecting at least one reflection feature of the reflection image (142) at at least one first image position (148) in the reflection image (142) and determining at least one longitudinal coordinate z of the selected reflection feature by optimizing at least one blurring function $f_a$;

providing at least one reference image (168), wherein the reference image (168) and the reflection image (142) are determined at two different spatial configurations, wherein the spatial configurations differ by the relative spatial constellation;

determining at least one reference feature in the reference image (168) at at least one second image position (154) in the reference image (168) corresponding to the longitudinal coordinate z; and determining the relative spatial constellation from the longitudinal coordinate z and the first image position (148) and the second image position (154).

26. A method for calibrating at least one detector (110) according to claim 1, the method comprising the following steps:

determining at least one reflection image (142) of the object (112) by using at least one sensor element (130) having a matrix (132) of optical sensors (134), the optical sensors (134) each having a light-sensitive area (136);

selecting at least one reflection feature of the reflection image (142) at at least one first image position (148) in the reflection image (142) and determining at least one longitudinal coordinate z of the selected reflection feature by optimizing at least one blurring function $f_a$;

providing at least one reference image (168), wherein the reference image (168) and the reflection image (142) are determined at two different spatial configurations, wherein the spatial configurations differ by a relative spatial constellation;

determining at least one reference feature in the reference image (168) at at least one second image position (154) in the reference image (168) corresponding to the longitudinal coordinate z;

determining the relative spatial constellation from the longitudinal coordinate z and the first and second image positions; and storing the relative spatial constellation as calibration value in at least one data storage device of at least one evaluation unit.

27. A method of using the detector (110) according to claim 1, the method comprising using the detector for one or more of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; and a manufacturing application.

* * * * *